United States Patent
El-Eskandarany et al.

(10) Patent No.: US 9,828,245 B1
(45) Date of Patent: Nov. 28, 2017

(54) METHOD OF SYNTHESIZING MGH$_2$/NI NANOCOMPOSITES

(71) Applicant: KUWAIT INSTITUTE FOR SCIENTIFIC RESEARCH, Safat (KW)

(72) Inventors: Mohamed Sherif Mohamed Mostafa El-Eskandarany, Safat (KW); Ehab Abdelhaleem Abdelmotalb Shaaban, Safat (KW); Naser Mustafa Abdul Nabi Ali, Safat (KW); Fahad Ahmed Jasem Mohamed Aldakheel, Safat (KW); Abdullah Ramadhan Abdullah Alkandary, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 15/426,968

(22) Filed: Feb. 7, 2017

(51) Int. Cl.
*C01B 3/00* (2006.01)

(52) U.S. Cl.
CPC ................... *C01B 3/0042* (2013.01)

(58) Field of Classification Search
CPC .................................................. C01B 3/0042
See application file for complete search history.

(56) References Cited

U.S. PATENT DOCUMENTS 3,591,362 A * 7/1971 Benjamin ................. B22F 9/04
                                                                 148/401
3,723,092 A    3/1973 Benjamin
6,332,908 B1  12/2001 Lee et al.

OTHER PUBLICATIONS

Varin et al. "Catalytic effects of various forms of nickel on the synthesis rate and hydrogen desorption properties of nanocrystalline magnesium hydride (MgH2) synthesized by controlled reactive mechanical milling" Journal of Alloys and Compounds 432 (2007) 217-231.*
El-Eskandarany and Sheban "Contamination effects on improving the hydrogenation/dehydrogenation kinetics of binary magnesium hydride/titanium carbide systems prepared by reactive ball milling" Materials 2015 8 6880-6892.*

* cited by examiner

*Primary Examiner* — Peter F Godenschwager
*Assistant Examiner* — Andrew J Oyer
(74) *Attorney, Agent, or Firm* — Richard C. Litman

(57) ABSTRACT

A method for synthesis of MgH$_2$/Ni nanocomposites includes balancing magnesium (Mg) powder in a ball milling container with helium (He) gas atmosphere; adding a plurality of nickel (Ni) milling balls to the container; introducing hydrogen (H$_2$) gas to the container to form a MgH$_2$ powder; milling the MgH$_2$ powder using the Ni-balls as milling media to provide MgH$_2$/Ni nanocomposites. The milling can be high-energy ball milling, e.g., under 50 bar of hydrogen gas atmosphere. The high-energy ball milling can be reactive ball milling (RBM). The method can be used to attach Ni to MgH$_2$ powders to enhance the kinetics of hydrogenation/dehydrogenation of MgH$_2$.

9 Claims, 21 Drawing Sheets

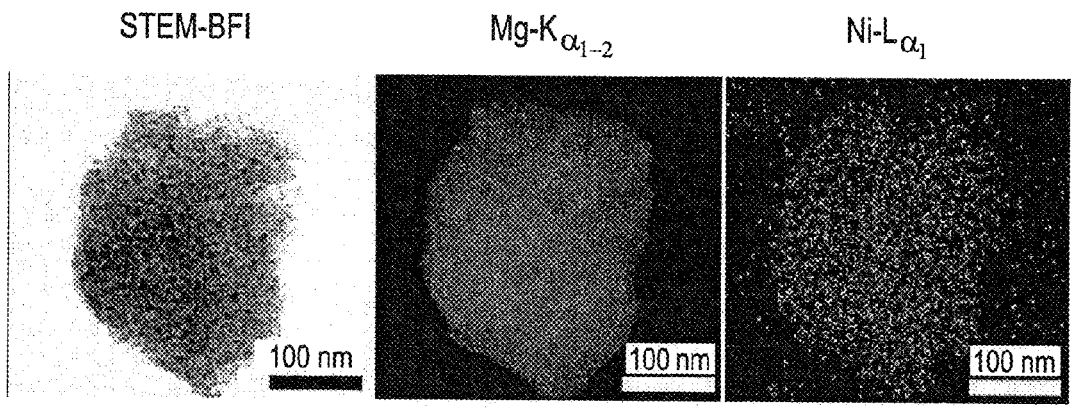
FIG. 3A  FIG. 3B  FIG. 3C
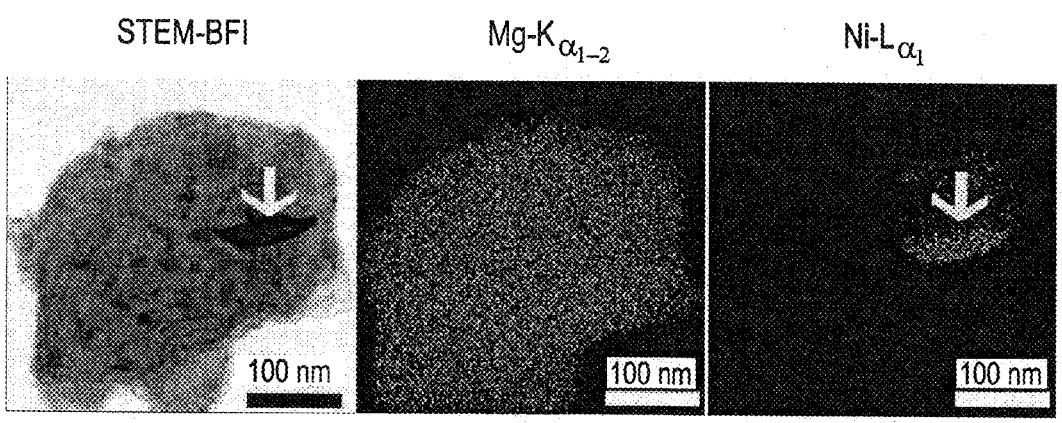
FIG. 3D  FIG. 3E  FIG. 3F

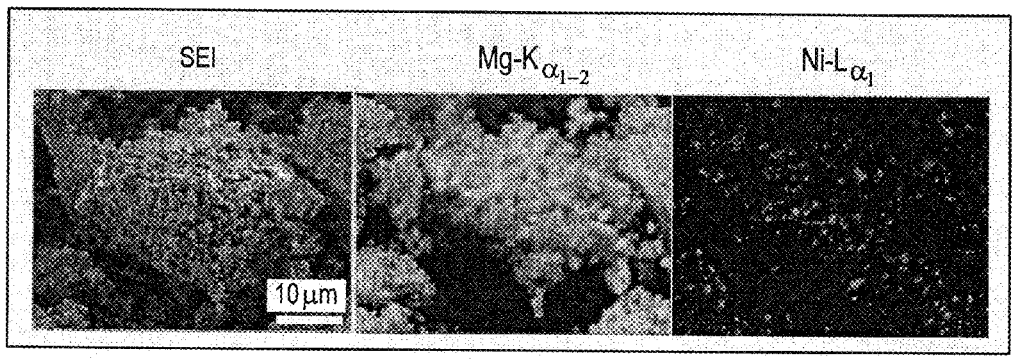
*FIG. 14A*    *FIG. 14B*    *FIG. 14C*

METHOD OF SYNTHESIZING MGH$_2$/NI NANOCOMPOSITES

BACKGROUND OF THE INVENTION

1. Field of the Invention

The present invention relates to a method of preparing metal nanocomposites, and particularly, to a method of preparing nanocomposites using reactive ball milling of metal powders under hydrogen pressure.

2. Description of the Related Art

Owing to the dramatic global environmental changes associated with man-made carbon dioxide emissions and the huge consumption of the limited resources of fossil fuels, developing alternate energy sources is important for a sustainable future. The increase in threats from global warming due to the consumption of fossil fuels requires our planet to adopt new strategies to harness the inexhaustible sources of energy. Hydrogen is an energy carrier, which holds tremendous promise as a new clean energy option. It is a convenient, safe, versatile fuel source that can be easily converted to a desired form of energy without releasing harmful emissions. A key advantage of hydrogen is that when burned, carbon dioxide ($CO_2$) is not produced.

Magnesium (Mg) and Mg-based materials can store hydrogen in a solid-state matter. The natural abundance, cheap price, operational cost effectiveness, light weight, and high hydrogen storage capacity (7.60 wt. %, 0.11 kg $H_2L^{-1}$) are some advantages of Mg and Mg-based alloys that make them desirable storage materials for research and development. Since 1991, nanocrystalline $MgH_2$ powders have been successfully produced near room temperature by reactive ball milling technique (RBM) using a high-energy ball mill operated at hydrogen atmospheric pressure.

There are some major drawbacks found in conventional $MgH_2$ systems, however. Firstly, $MgH_2$ shows a high thermal stability making the hydrogen releasing at moderate. temperatures (below 400° C.) very difficult. Secondly, $MgH_2$ exhibits very slow kinetics of hydrogenation/dehydrogenation at temperatures less than 400° C. Thus, innumerable efforts have been tackled to improve the kinetics behavior of $MgH_2$ by catalyzing the metal hydride powders with wide spectrum of mono, binary and multicatalytic systems. One such effort involved catalyzing the $MgH_2$ powders by ball milling with transition metal powders of Ti, V, Mn, Fe and Ni. In another work, $MgH_2$ powders were catalyzed by a small amount (1 mol. %) of Fe, Co, Ni and Cu nanoparticles. The mechanically doped $MgH_2$/Ni powders obtained after a very short milling time (2 h).

Thus, a method of synthesizing metal nanocomposites using reactive high energy ball milling (RBM) process thereby solving the aforementioned problems is desired.

SUMMARY OF THE INVENTION

A method for synthesis of $MgH_2$/Ni nanocomposites includes balancing magnesium (Mg) powder in a ball milling container with helium (He) gas atmosphere; adding a plurality of nickel (Ni) milling balls to the container; introducing hydrogen ($H_2$) gas to the container to form a $MgH_2$ powder, and milling the $MgH_2$ powder using the Ni milling balls as milling media to provide $MgH_2$/Ni nanocomposites. The method can be used to attach Ni to $MgH_2$ powders to enhance the kinetics of hydrogenation/dehydrogenation of $MgH_2$.

These and other features of the present invention will become readily apparent upon further review of the following specification and drawings.

BRIEF DESCRIPTION OF THE DRAWINGS

FIG. 3A shows an STEM-BF image of a typical composite aggregate (~300 nm in diameter) containing dark grey nano-spherical lenses (~5 nm in diameter) embedded into a light-gray matrix; FIG. 3B shows the STEM-EDS elemental mapping of Mg-$K_{\alpha1-2}$ (powders obtained after 25 h of RBM using Ni-balls milling media); FIG. 3C shows the STEM-EDS elemental mapping of Ni-$L_{\alpha1}$ (the powders obtained after 25 h of RBM using Ni-balls milling media); FIGS. 3D, 3E and 3F, respectively, show the STEM images and corresponding EDS-elemental mapping of Mg and Ni for a different sample obtained after 25 h of reactive ball milling (RBM) a mixture of $MgH_2$ doped with 5.5 wt. % Ni nanoparticles (the arrows shown in FIGS. 3D and 3F refer to agglomerated Ni particles adhered onto the $MgH_2$ aggregated powders.

FIG. 14A shows the SE-image of MgH$_2$ powders; FIG. 14B shows EDS-elemental mapping of MgK$_{\alpha 1-2}$; and FIG. 14 C shows EDS-elemental mapping of Ni-L$_{\alpha 1}$ obtained after 3 h of RBM time, using Ni-balls milling media.

Similar reference characters denote corresponding features consistently throughout the attached drawings.

DETAILED DESCRIPTION OF THE PREFERRED EMBODIMENTS

A method for synthesis of MgH$_2$/Ni nanocomposites includes balancing magnesium (Mg) powder in a ball milling container with helium (He) gas atmosphere, adding a plurality of nickel (Ni) milling balls to the container, introducing hydrogen (H$_2$) gas to the container to form a MgH$_2$ powder; milling the MgH$_2$ powder using the Ni-balls as milling media to provide MgH$_2$/Ni nanocomposites. The ball to powder ratio can be about 38:1. The Ni balls can be about 11 mm in diameter. The milling can be high-energy ball milling, e.g., under 50 bar of hydrogen gas atmosphere. The high-energy ball milling can be reactive ball milling (RBM). The ball milling can take place for a period of time ranging from about 25 hours to about 50 hours. The MgH$_2$/Ni nanocomposites can include a homogeneous distribution of Ni particles embedded in a MgH$_2$ matrix. The average composition of the nanocomposite powder can be about 94.5 wt. % MgH$_2$ and about 5.5 wt. % Ni. The Mg powder can have an average particle size of about 100 micrometers. The method can be used to attach Ni to MgH$_2$ powders to enhance the kinetics of hydrogenation/dehydrogenation of MgH$_2$. The high energy collision occurs at room temperature or a temperature ranging from about 25° C. to about 275° C.

The ball mill is operated for a period of time to achieve high-energy collision of the milling balls for up to 100 hours, but preferably for a time period ranging from about 25 hours to about 50 hours. A particle size of the nanocomposite can range from about 1 nm to about 100 nm.

Amongst the many specious used as catalysts or additives for enhancing the poor hydrogenation/dehydrogenation behaviors of MgH$_2$ powders, Ni is the most ideal. This is attributed to its high performance for hydrogen splitting and its very low cost when compared with noble metals such as Pd and Pt. New Ni-based catalysts can include e.g., Ni—Zr$_{16}$, ZrPdNi$_5$, and known noble-metal-based catalysts can be replaced with reliable Ni and Ni-based analogs.

Figure 13A:
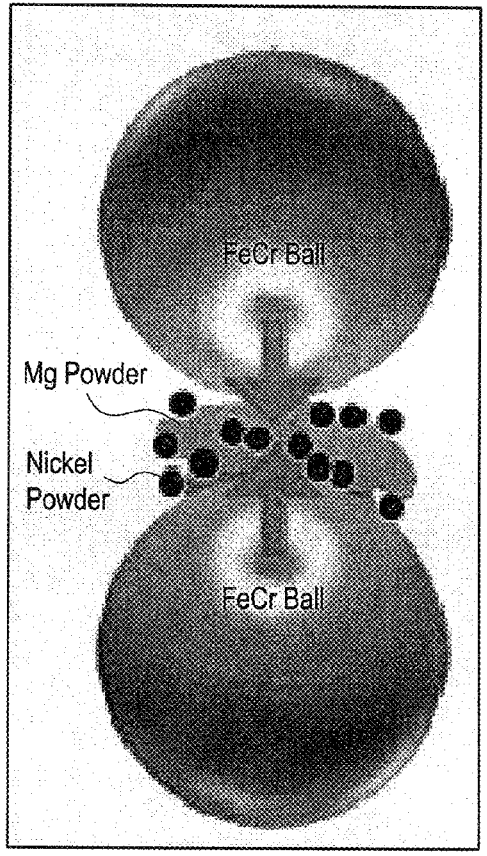
FIG. 13A shows the schematic of ball powder ball collisions during ball milling of Mg powder with 5.5 wt. % Ni particles, using FeCr.
Figure 13B:
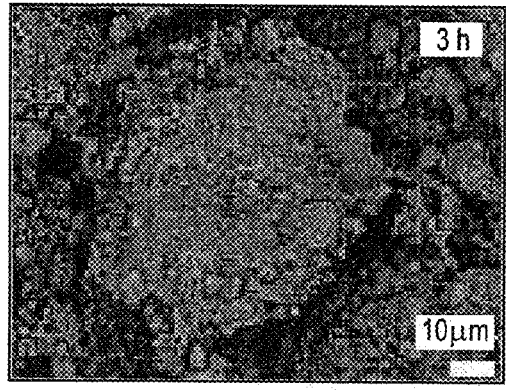
FIGS. 13B-G show the FE-SEM micrographs of the morphological characterizations of the composite powders obtained after (B) 3 h, (C) 6 h, (D) 12.5 h, (E) 25 h, (F) 50 h, and (G) 100 h, respectively.
Figure 13C:
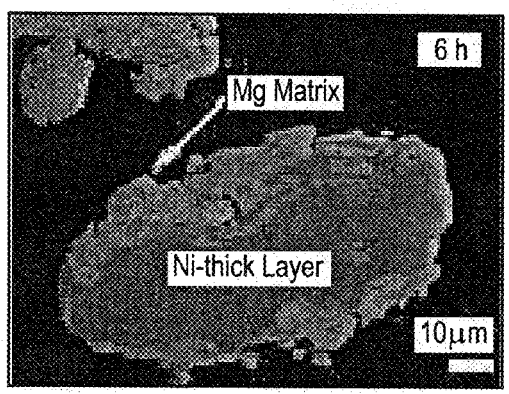
Figure 13D:
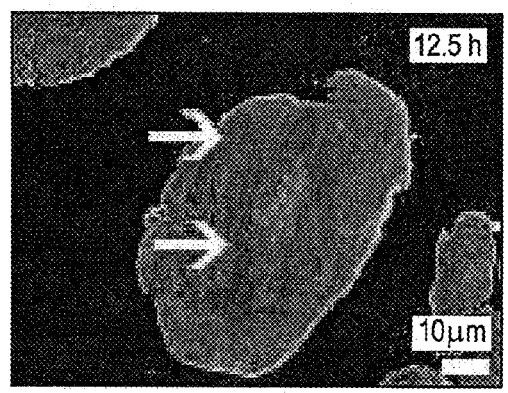
Figure 13E:
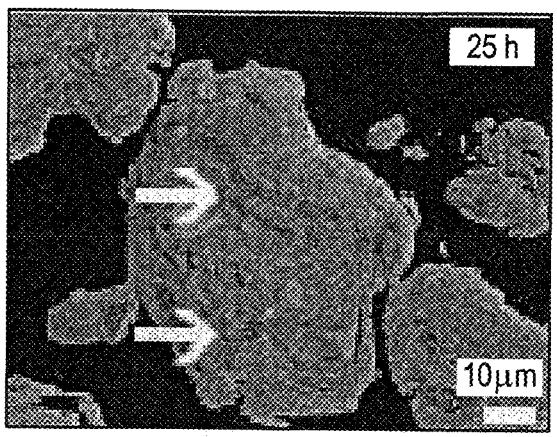

While catalyzing of MgH$_2$ powders by Ni is usually carried out by "manually" doping the powders with the desired weight percentage of Ni particles/nanoparticles, followed by mechanical ball-milling for certain time that can be extended to several hundred hours. A major drawback of this traditional approach is the long milling time required to ensure a uniform dispersion of Ni into the MgH$_2$ matrix. A more serious disadvantage of this common process is the tendency of metallic Ni powders to form aggregates during the first few hours (3 h) of milling (FIG. 13(B)). Increasing the milling time (6 h) leads the Ni powders to form thick-layered like metallography into the Mg-powders, as shown in FIG. 13(C). These layers are refined with increasing the ball milling time (12.5 h FIG. 13(D)), resulting in the formation of MgH$_2$/thin Ni-layered composites, as shown in FIG. 13(E).

Figure 13F:
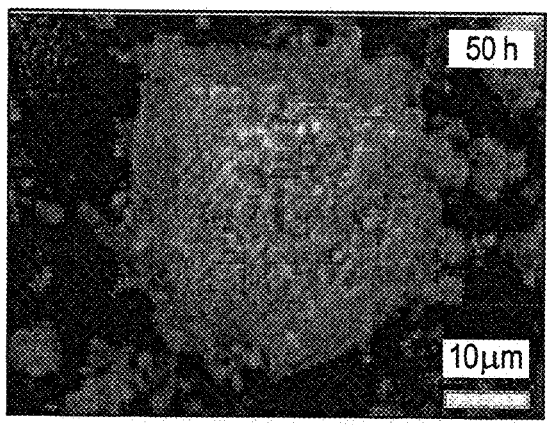
Figure 13G:
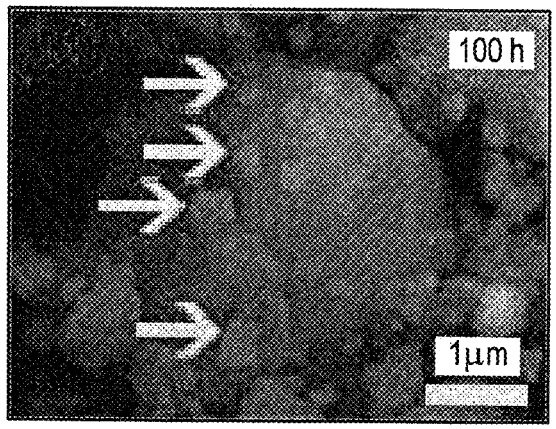
Figure 13H:
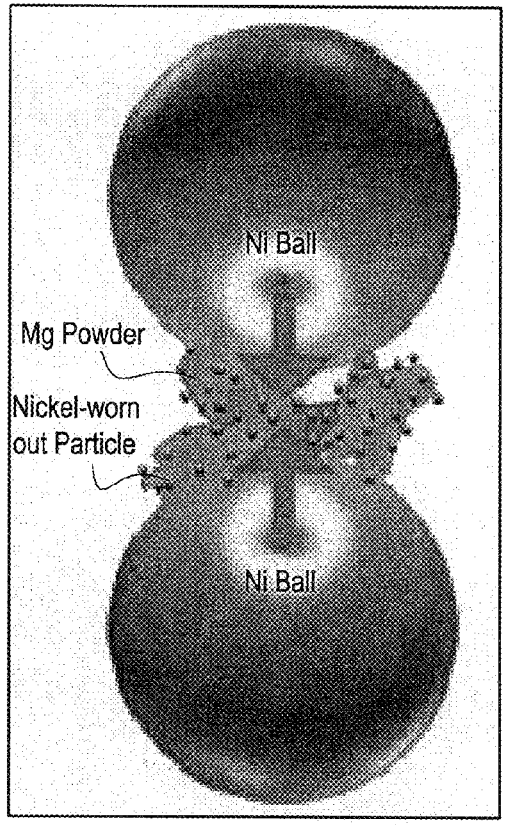
FIG. 13H schematically shows the in-situ catalyzation mechanism, using Ni-balls milling media.
Figure 13I:
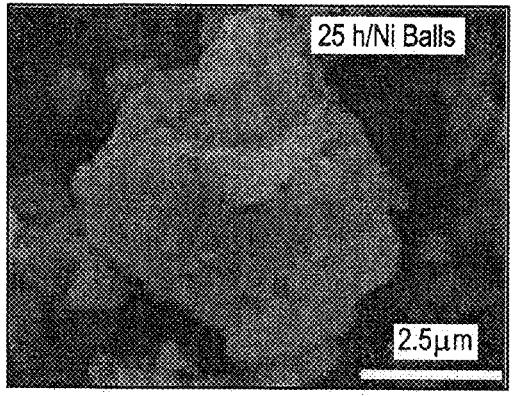
FIG. 13I shows the FE-SEM micrograph of MgH$_2$ powders obtained after 50 h.
Figure 13J:
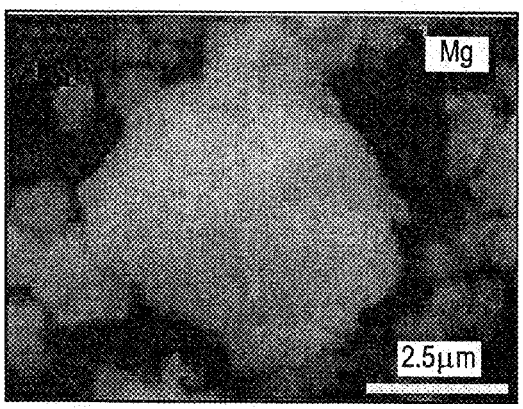
FIG. 13J and FIG. 13K show the corresponding EDS-elemental mapping of Mg and Ni, respectively.
Figure 13K:
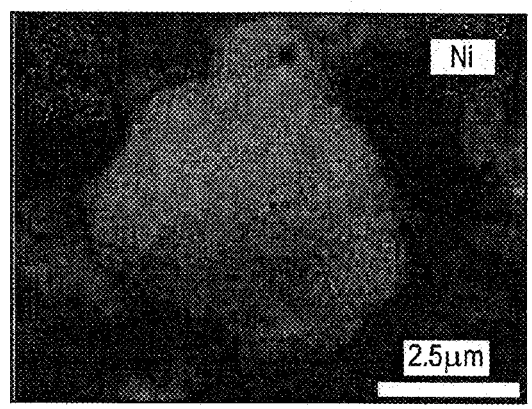

At the intermediate of milling, the powders showed dramatic variation in their Ni contents from particle to particle and even within the particle itself. Toward the end of the milling process (50 h-100 h), the Ni layers were disintegrated into small particles adhered on the surface of MgH$_2$ powders, as displayed in FIGS. 13(F) and 13(G).

In contrast to the common mechanically-induced catalyzation technique, the present inventors have discovered a new approach of gradual "in-situ catalyzation" of MgH$_2$ powders during the ball milling process. Gradually introducing the Ni powders into the Mg/MgH$_2$ powders avoids formation of thick-Ni layers and ensures homogeneous distribution of Ni particles into the powder matrix.

This alternative novel catalyzation method was carried out by high-energy ball milling of hcp-Mg powders under high pressure (50 bar) of hydrogen gas atmosphere, using Ni-balls milling media, as schematically illustrated in FIG. 14(H). The experiments were repeated for three independent runs to ensure the reproductivity of the results.

After 3 h of ball milling, the Mg powder agglomerated according to the cold welding effect during the milling process to form aggregates extended in sizes to about 60 µm in diameter FIG. 14(A). Our results showed that at this early stage of RBM, the Mg powders FIG. 14(B) were homogenously catalyzed with Ni fine particles FIG. 14(C) that were worn out from the milling media (Ni-balls). Neither Ni-aggregates nor layers were formed at this stage of milling. However, the Ni powders dispersed into Mg matrix after this stage of milling was less than 1 wt. %, and were excellently distributed in the whole range of the matrix, as elucidated in FIG. 14(C). This is attributed to the absence of agglomerated Ni-layers that is usually associated with using a high content of metallic Ni powders.

Figure 1A:
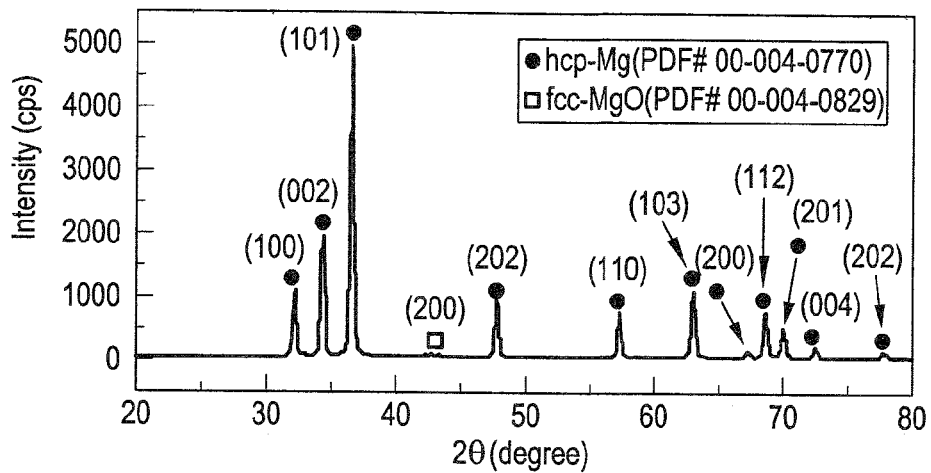
FIGS. 1A, 1B, and 1C, respectively, show the X-ray diffraction (XRD) patterns of mechanically hexagonal closed packed (hcp) Mg powders obtained after 0 h (FIG. 1A), after 12.5 h (FIG. 1B), and 25 h (FIG. 1C) of reactive ball milling (RBM) using high energy ball mills.
Figure 5A:
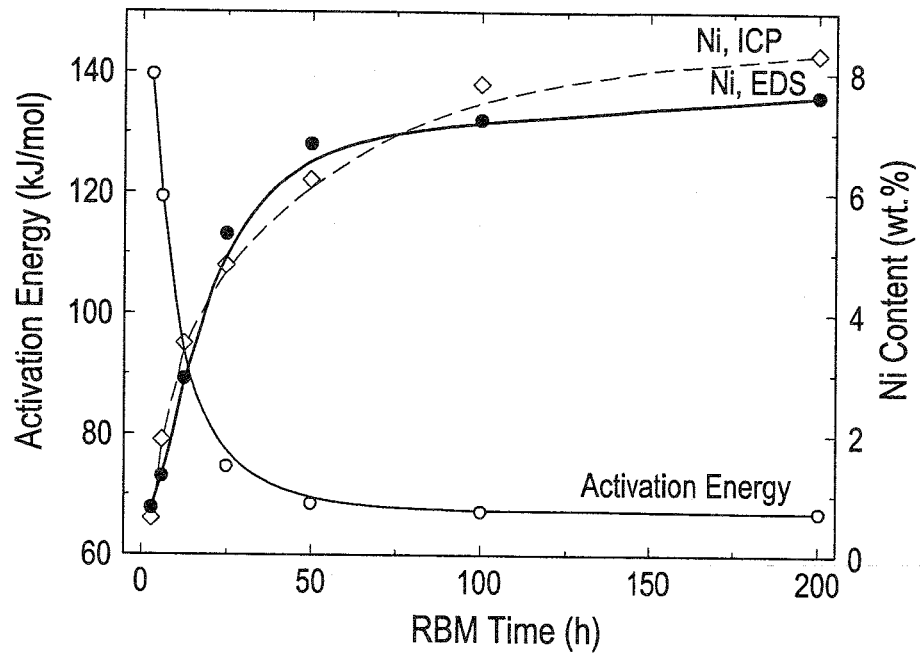
FIG. 5A and FIG. 5B show effect of the RBM time (A) Ni and (B) Fe contents, respectively, on the activation energy of $MgH_2$ powders, obtained after different stages of RBM.

During the next stages of milling, Ni particles were gradually worn out from the Ni palls and hence dispersed into the MgH$_2$ matrix, as suggested by the gentle increasing of Ni content with increasing the milling time shown in FIG. 5(A). Such gradual introduction of Ni catalytic agent to the MgH$_2$ powders led to form homogeneous composite powders with outstanding Ni particles distribution. During the first few hours of RBM, Mg metal preferred to react with hydrogen gas to form β- and γ-MgH$_2$ phases instead of reaction with Ni (low concentration), as shown in FIG. 1(C). However, while Mg$_2$NiH$_4$ phase somehow showed better kinetics behaviors compared with MgH$_2$, it revealed unattractive hydrogen storage capacity (~3.5 wt. %).

Figure 8A:
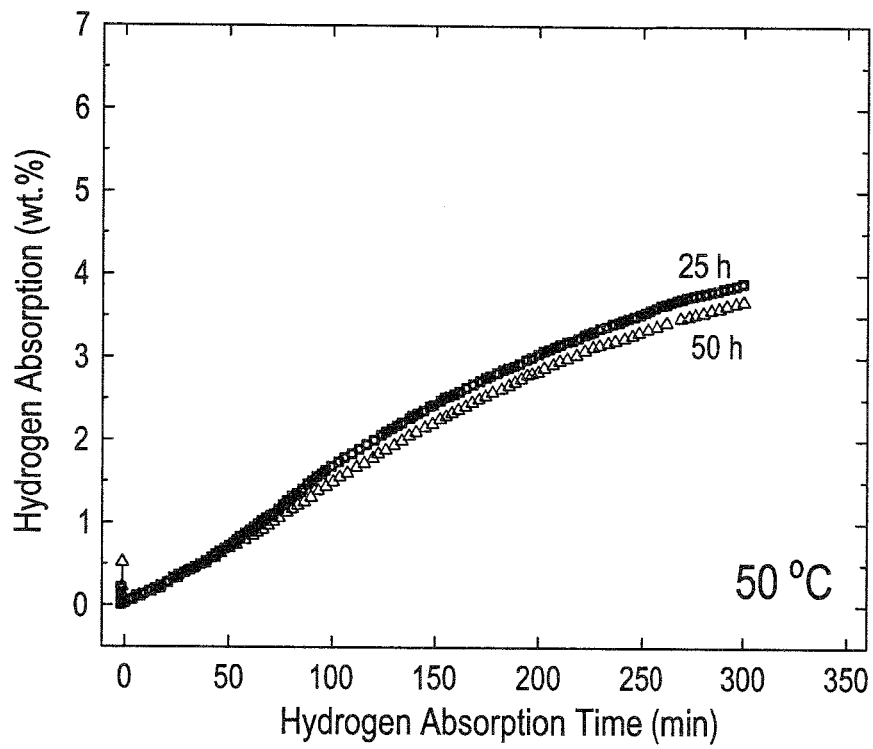
FIGS. 8A-D shows the kinetics of hydrogenation/adsorption of $MgH_2$ powders after RBM measured at (A) 50° C., (B) 100° C., (C) 250° C., and (D) 275° C., respectively, for $MgH_2$ powders obtained after 25 h and 50 h of the RBM time, using Ni-balls milling media.

The fine Ni particles introduced to the Mg metal matrix during milling process tackled under hydrogen gas atmosphere led to splitting the hydrogen molecules into hydrogen atoms, facilitating fast gas-solid reaction that was completely achieved within 25 h (FIG. 1(C)). These fine Ni particles adhered onto the surface of $MgH_2$ (FIG. 3(C)) facilitating fast hydrogenation kinetics even at low temperatures (FIGS. 8(A) and 8(B)). The hydrogenation/dehydrogenation kinetics were monotonically enhanced upon increasing the RBM time from 12.5 h to 50 h that led to improve the Ni particles distribution onto the surfaces of $MgH_2$ powder particles.

Such fine Ni particles played a vital role as grain growth inhibitors to maintain a short diffusion distance of hydrogen atoms along the $MgH_2$ nanograins. Accordingly, the decomposition of $MgH_2$ led to release the hydrogen atoms and formation of hcp-Mg was greatly enhanced FIGS. 10(A) and 10(B).

The present method provides a new approach for catalyzing $MgH_2$ with Ni nanograins. The method includes high-energy reactive ball milling of Mg metal under 50 bar of hydrogen gas atmosphere, using Ni-balls milling media. The results show that the present method had surprising benefits, including improved the hydrogenation/dehydrogenation processes compared to the slower with hydrogenation/dehydrogenation of the as-doped $MgH_2$ by Ni nanoparticles and with $MgH_2$ powders milled with FeCr-balls.

The data and results suggest that introducing Ni-particles into the $Mg/MgH_2$ powders in a "gradual-dosing" fashion during the RBM process leads to improving the homogeneity of the composite powders and maintenance of the nanocrystalline characteristics of $MgH_2$ powders. Several advantages can be observed to flow from this inventive process. For example, the method provides catalyzation of $MgH_2$ by milling the powders with Ni balls for the first time. This process offers an efficient and cost effectiveness catalyzation method. The proposed catalyzation process provides superior catalytic effect on enhancing the behavior of $MgH_2$. The Ni-balls milling media play two important functions; the first related to $MgH_2$ catalyzation, and the second related to the powders grain refining. The inventive process shows extraordinary fast hydrogenation and dehydrogenation kinetics, which leads to a long-cycle-life-time for hydrogen absorption/desorption at moderate temperature without drastic grain growth and the absence of any degradations on the hydrogen storage capacity of $MgH_2$.

For the reactive ball milling process described in the examples set forth herein, the starting materials included: commercial magnesium (Mg) powders with 50 μm in diameter and 99.5 wt. % purity, PubChem Substance ID 13112 (provided by SIGMA Aldrich, USA); helium gas (He) cylinders (99.999% purity) (provided by a local gas company in Kuwait). Hydrogen gas ($H_2$) cylinders (99.999% purity) (provided by a local gas company in Kuwait).

The materials fabrication equipment, devices, and tools described in the examples set forth herein included: He-gas atmosphere-glove box (UNILAB Pro Glove Box Workstation) (provided by BRAUN, Germany); Ni balls (purity of 99.9 w. %, and of 11 mm in diameter) (provided by Wako Pure Chemical Industries, Ltd., Japan, product #144-07255). A 220 ml volume hardened steel high pressure milling vial (provided by Evico Inc., Germany); gas-pressure gauge for hydrogen pressure measurements, gas-temperature-monitoring system (provided by Evico Inc., Germany); and Planetary Ball Mill PM400 (provided by Retsch, Germany). Hand mixing tools of agate mortar and pestle.

The following examples are provided by way of illustration to describe the preparation and evaluation of the nanocomposites.

Example 1

Preparation of $MgH_2$ Powders

An amount of 5 g of Mg was balanced inside a helium (He) gas atmosphere-glove box and then sealed together with twenty-five Ni-balls (11 mm in diameter) into the hardened steel vial. The ball-to-powder weight ratio was about 38:1. The vial was evacuated to the level of $10^{-3}$ bar before introducing hydrogen ($H_2$) gas to fill the vial with a pressure of 50 bar. Reactive ball milling (RBM) was carried out at room temperature using the PM400 high energy ball mill. The mechanically-induced gas-solid reaction was regularly halted after 6, 12.5, 25, 50, and 100 hours of RBM time, where a small amount (~50 mg) was discharged from the vial in the glove box powders. The as-reacted ball milled powders obtained after different milling times were discharged into 8 Pyrex vials and kept under vacuum for analysis.

The crystal structure of all samples was investigated by X-ray diffraction (XRD) with CuKα radiation, using 9 kW Intelligent X-ray diffraction system, provided by SmartLab-Rigaku, Japan. The local structure of the synthesized powders was studied by 200 kV-field emission high resolution transmission electron microscopy (FE-HRTEM)/scanning transmission electron microscopy (STEM) supplied by JEOL-2100F, Japan, and equipped with Energy-dispersive X-ray spectroscopy (EDS) supplied by Oxford Instruments, UK.

Shimadzu Thermal Analysis System/TA-60WS, using differential scanning calorimeter (DSC), was employed to investigate the decomposition temperatures of $MgH_2$-based composite powders with heating rate of 20° C./min.

Different DSC experimental set with different heating rates (k) of 2, 5, 10, 20, and 30° C./min were achieved in order to investigate the activation energy (Ea) of decomposition, using Arrhenius approach (Eq. 1):

$$E_A = -rt\, \text{Ln}(k) \tag{1}$$

where k is a temperature-dependent reaction rate constant, R is the gas constant, and T is the absolute temperature. The value (Ea) of the reaction was determined by measuring the decomposition peak temperature (Tp) corresponded to the different heating rates and then plotting ln(k) versus 1/Tp.

Example 2

The Hydrogenation/Dehydrogenation Behaviors of Magnesium Powder

Hydrogen pressure-composition-temperature (PCT) and absorption/desorption kinetics were investigated via Sievert's method, using PCTPro-2000, provided by Setaram Instrumentation, France, under hydrogen gas pressure in the range between 200 mbar to 8 bar. The samples were examined at different temperatures of 50, 100, 250, and 275° C. respectively.

X-ray diffraction (XRD) and field emission-high resolution transmission electron microscope (FE-HRTEM) techniques were employed to investigate the structural changes of hcp-Mg powders upon RBM under a hydrogen gas pressure (50 bar), using Ni-balls as milling media. The XRD pattern of elemental Mg powders (precursor) is shown in FIG. 1A. The powders consisted of large polycrystalline grains, suggested by the sharp Bragg-peaks related to hcp-Mg.

Figure 1B:
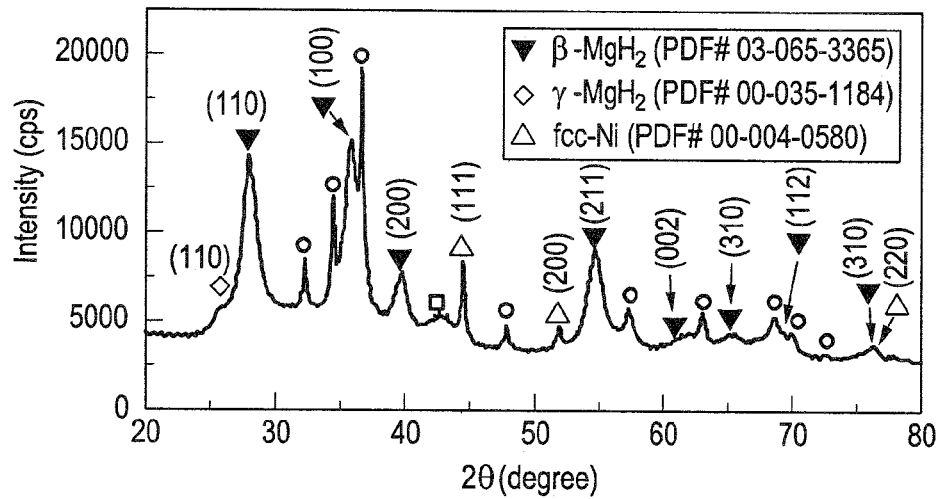
Figure 1C:
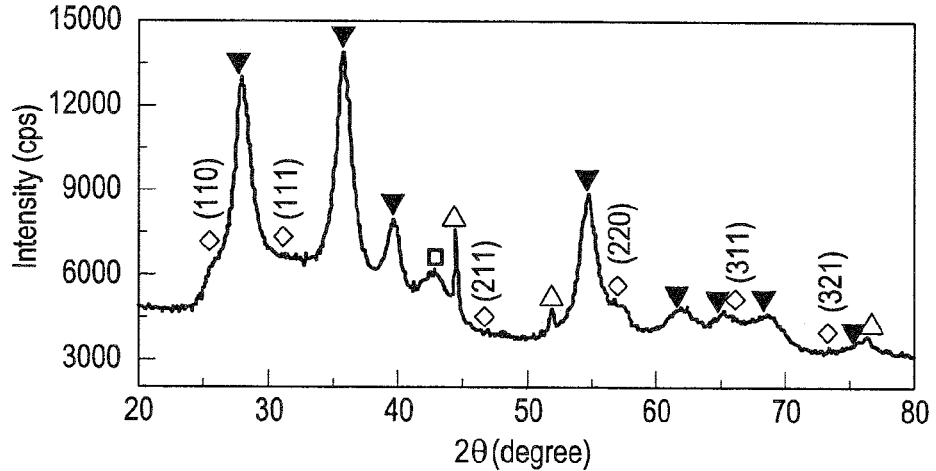

After 12.5 h of RBM time, new Bragg-peaks corresponding to γ-MgH$_2$ and β-MgH$_2$ appeared, implying the progress of a gas-solid reaction taking place between hydrogen gas and Mg powders FIG. 1(B). Besides these peaks, a new set of Bragg-lines became noticeable in the XRD presented in FIG. 1(B). Careful analysis of these lines indicated that they corresponding to fcc-Ni metal introduced to the powders due to employing of Ni-balls as milling media.

Toward the end of RBM time (25 h); all the diffracted lines related to hcp-Mg completely disappeared, suggesting the completion of RBM process as shown in FIG. 1(C). The broadening manifested in the Bragg peaks shown in FIG. 1(C) raised from both refinement of the MgH$_2$ crystallites and accumulated macrostrain during the RBM process. Moreover, the Bragg-peaks of fcc-Ni metal maintained their peak positions after 25 h of RBM, implying the absence of Ni solubility into the MgH2 lattice, as elucidated in FIG. 1(C). These results comes in contrast to those demonstrating formation of Mg$_2$NiH$_4$ phase during ball milling of MgH$_2$ with Ni metal used as catalysts to improve the hydrogenation behavior of MgH$_2$.

Figure 2A:
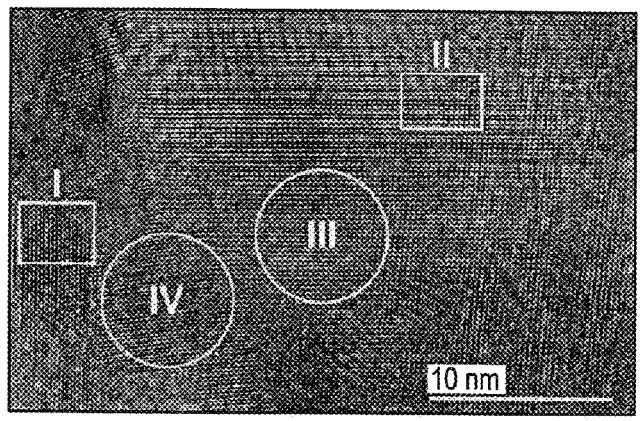
FIG. 2A shows the HRTEM image of the as-synthesized $MgH_2$ powders obtained after 25 h of RBM time, using Ni-balls milling media (FIG. 2A)
Figure 2B:
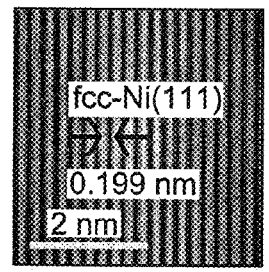
FIGS. 2B and 2C show the corresponding Fast Fourier transform (FFT) of zones I and II indexed in FIG. 2(A), respectively.
Figure 2C:
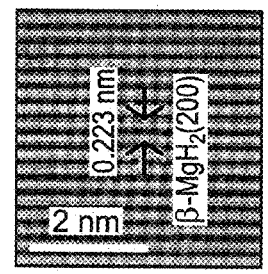
Figure 2D:
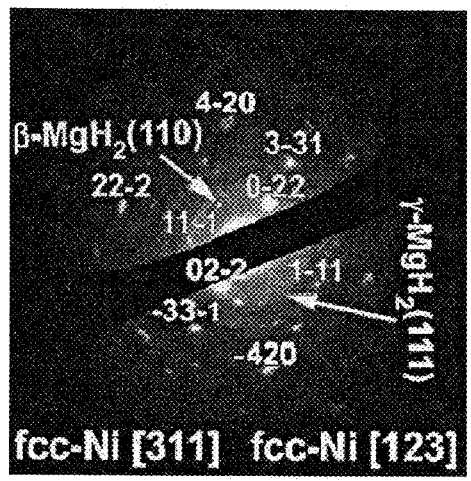
FIGS. 2D and 2E show the diffraction pattern of the $MgH_2$ crystals.
Figure 2E:
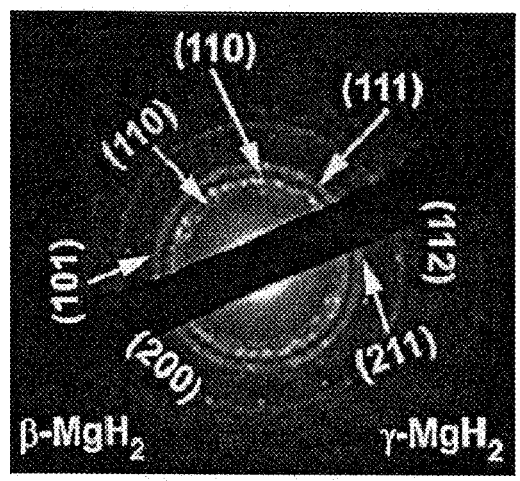

The HRTEM micrograph of the powders obtained after 25 h of RBM is shown in FIG. 2(A). The powders revealed Moiré-like fringes with nanocrystalline-structure contained crystallites ranged in sizes between 5 nm to 17 nm in diameter FIG. 2(A). The filtered lattice resolution TEM image corresponding to zone I indexed in FIG. 2(a) is shown in FIG. 2(B). Obviously, the lattice fringes are regularly separated with an interplanar spacing (d) of 0.199 nm, which agrees well with the (111) lattice index of fcc-Ni metal, as presented in FIG. 2(B). The filtered atomic resolution TEM image corresponding to zone II (FIG. 2(A)) is shown in FIG. 2(C). The clear Moiré-like fringes with d spacing of 0.223 nm (FIG. 2(D)) matches well with γ-MgH2 (200) crystal. The nano beam diffraction pattern (NBDP) related to zone III implied precipitation of Ni crystals (oriented to zone axis [311] and [123]) coexisted with β-MgH$_2$ (111) and γ-MgH$_2$ (110) crystals, as elucidated in FIG. 2(D). Moreover, the corresponding selected area diffraction pattern (SADP) of zone IV FIG. 2(A) revealed continuous diffracted Debye-rings corresponding to γ-MgH2 (110) and γ-MgH$_2$ (111) phases, as presented in FIG. 2(E).

Based on careful transmission electron microscopy (TEM) analysis performed for at least 50 tested zones of three individual samples, it was not possible to detect the existence of any other phase(s) such as unprocessed Mg, Mg$_2$Ni alloy and/or Mg$_2$NiH$_4$.

The morphological characterizations of the MgH$_2$ powders obtained after 25 h of RBM time upon milling with Ni-balls were investigated by HRTEM/EDS-elemental mapping FIG. 3(A) shows the FE-scanning transmission electron microscope (STEM)/bright field (BF) image of MgH$_2$ powders obtained after RBM of 25 h, using Ni-balls milling media. The STEM-BF image shows a typical composite aggregate (~300 nm in diameter) containing dark grey nano-spherical lenses (~5 nm in diameter) embedded into a light-gray matrix, as elucidated in FIG. 3(A). The corresponding STEM-EDS elemental mapping of MgK$_{\alpha1-2}$ confirmed that the light grey matrix was related to MgH$_2$ phase FIG. 3(B), whereas those dispersoids nano-lenses shown in FIG. 3(A) correspond to Ni metal, as indicated by the STEM-EDS elemental mapping of Ni$_{\alpha1-2}$ in FIG. 3(C). It should be noted that the spherical-like morphology nanocrystalline Ni with their spherical lens-like structure were homogeneously distributed into the whole matrix of MgH$_2$ beyond the nano-scale level, as displayed in FIGS. 3(B) and (C).

In contrast, when the MgH$_2$ powders were doped with 5.5 wt. % of Ni nanoparticles (~10 nm in diameter) and then ball milled for 25 h of RBM time using Cr-steel balls, the catalytic metal agent of Ni nanoparticles were agglomerated to form larger flaky-like particles of 90 nm in diameter, as indexed in FIG. 3(D). Based on the large size of these agglomerated Ni particles, they were heterogeneously distributed into the MgH$_2$ matrix (FIG. 3(E), tended to be located in one zone FIG. 3(F) into the matrix, where the other matrix zones were catalyst-free, as elucidated in FIG. 3(F). The growth of Ni metallic powders was attributed to the cold welding effect resulting from increasing the local temperature inside the vial, which was related to the action of the milling media during the milling process. However, when Ni balls were used, the Ni particles worn out from the balls were gradually introduced to the MgH$_2$ matrix so that Ni catalysts had a good opportunity to be distributed in a homogeneous fashion into the metal hydride matrix without serious agglomeration behavior FIG. 3C.

Differential scanning calorimetry (DSC) performed at a constant heating rate of 20° C./min under a helium gas flow of 75 ml/min was employed to investigate the effect of RBM time and Ni concentration on the decomposition temperature (dehydrogenation temperature at normal pressure) of MgH$_2$ powders.

Figure 4:
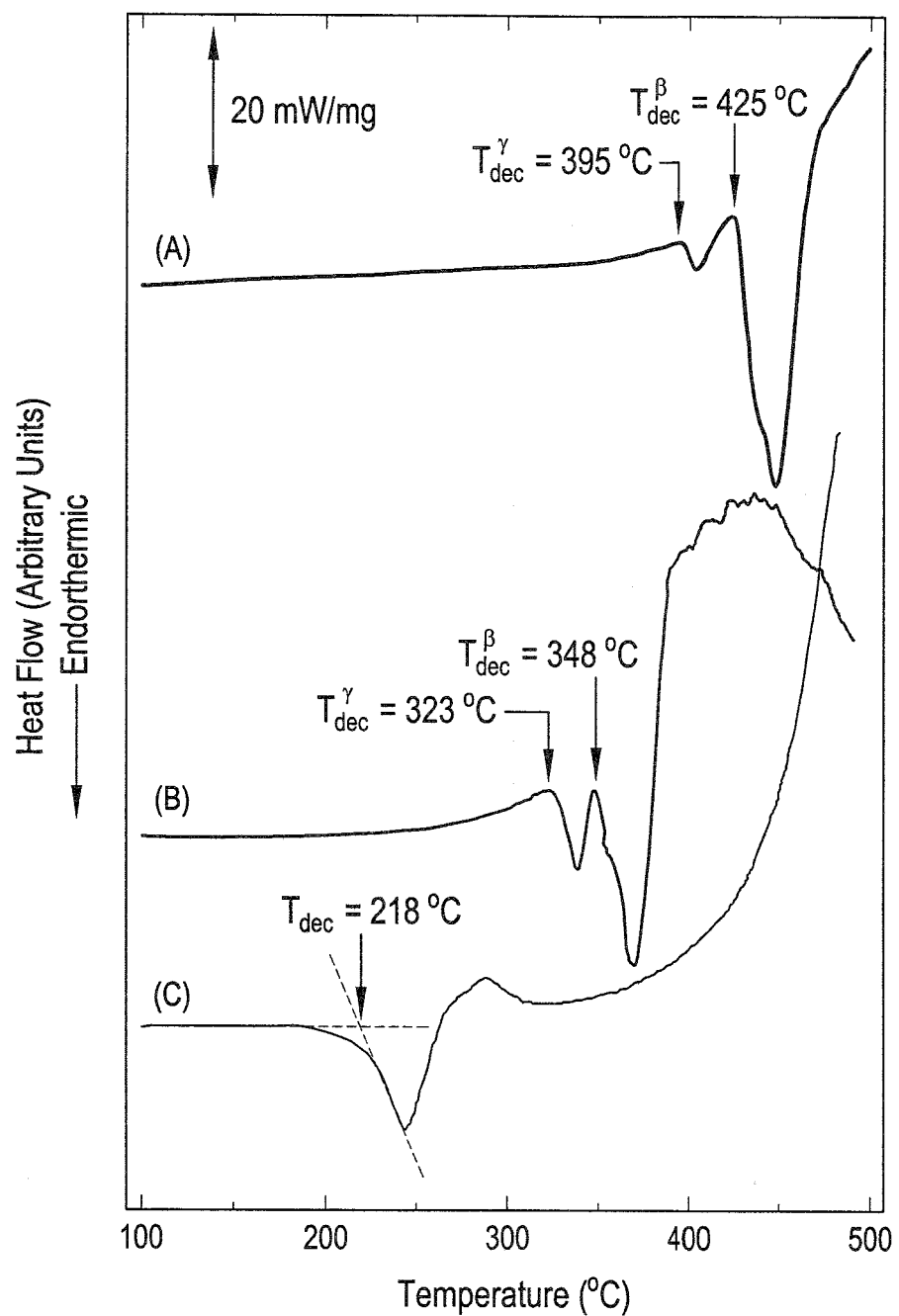
FIG. 4 shows the DSC curves of $MgH_2$ powders obtained after 6 h (A), 12.5 h (B), 25 h (C) of RBM time, respectively, using Ni-balls milling media.

The DSC trace of as-synthesized MgH$_2$ powders obtained after 6 h of RBM revealed two separated endothermic events at an onset temperature of 395° C. and 425° C., as shown in FIG. 4(A).

The XRD analysis of the powders that were individually heated up to 400° C. indicated the absence of γ-MgH$_2$ phase, where γ-MgH$_2$ phase remained. Therefore, it can be concluded that the first endothermic reaction peak referred to the decomposition process of γ-MgH$_2$ metastable phase. In contrast, the XRD analysis of the sample heated to 480° C. revealed the formation of a single hcp-Mg phase, indicating that the second endothermic event was related to the decomposition of β-MgH$_2$ phase.

These two endothermic reaction peaks were significantly shifted to the low temperature side to appear at 323° C. and 348° C. upon increasing the RBM time to 12.5 h, as elucidated in FIG. 4(B). Such significant decreasing of the decomposition temperature was related to an increasing of Ni volume fraction introduced to the milled powders FIG. 4(D), leading to destabilize the MgH$_2$ phases.

After 25 h of RBM time, the two endothermic decomposition peaks, overlapped to disclose a wider endothermic peak, appeared at a relatively low decomposition temperature of 218° C., as displayed in FIG. 4(C).

In order to realize the effect of Ni catalysts introduced to the powders upon increasing the RBM time on the activation energy (Ea) of MgH$_2$ powders, individual DSC experiments were conducted with different heating rates (5, 10, 20, 30 and 40° C./min) for the samples obtained after 3, 6, 12.5, 25, 100, and 200 h of RBM time. The activation energy (Ea) of dehydrogenation related to each sample was calculated according to the Arrhenius equation.

FIG. 5(A) shows the dependence of the activation energy (Ea) on RBM time and Ni concentration (blue-line) analyzed by two different techniques; namely EDS and inductively coupled plasma mass spectrometry (ICP-MS). Increasing the RBM time led to increase the number of ball-powder-ball collision, resulting an increase in the Ni particles worn away from the surface of Ni balls. Accordingly, MgH$_2$ powders were continuously in-situ catalyzed by Ni that was monotonically increased during the first stage of RBM time from 0.8 wt. % (3 h) to 5.5 wt. % (25 h), as elucidated in FIG. 5(A).

The Ni balls at the beginning of the RBM process had Mg powder-free-coated surfaces. After 25 h-50 h of RBM time, the Ni-balls, coated by the soft Mg powders, acted as Ni-wear resistant coats. This led to terminate the steep inclination of Ni mole fractions introduced to the milled powders to be about 7.2 wt. % FIG. 5(A). The $MgH_2$ powders obtained during the second stage of RBM (25-50 h) tended to coat the Mg-layers adhered onto the surface of Ni-balls, as elucidated in FIG. 1(C). During the last stage of RBM, Ni concentration was almost saturated at values ranging from about 7.3 to about 7.8 wt. %, as shown in FIG. 5(A).

The $E_a$ of dehydrogenation was very sensitive to the changing of RBM time and Ni concentration, as indicated in FIG. 5(A). In fact, increasing the RBM time not only lead to an increase in the Ni mole fraction introduced to the powders, but it also led to introduce sever lattice imperfections to the milled powders, thereby destabilizing the $MgH_2$ phase. These imperfections lead to disintegration of the $Mg/MgH_2$ particles to form smaller crystallites that can facilitate better hydrogen diffusion with faster hydrogenation/dehydrogenation kinetics.

The $MgH_2$ powders obtained after 3 h-6 h of RBM time had large $E_a$ values (140-120 kJ/mol), as shown in FIG. 5(A). After 12.5 h, the $E_a$ was sharply decreased to about 90 kJ/mole and reached to less than 75 kJ/mol and 69 kJ/mol for the powders obtained after 25 h and 50 h of RBM time, respectively FIG. 5(A). When the Ni concentration was terminated during the last stage of RBM (100 h-200 h), no significant changes on $E_a$ could be seen, as displayed in FIG. 5(D).

Figure 5B:
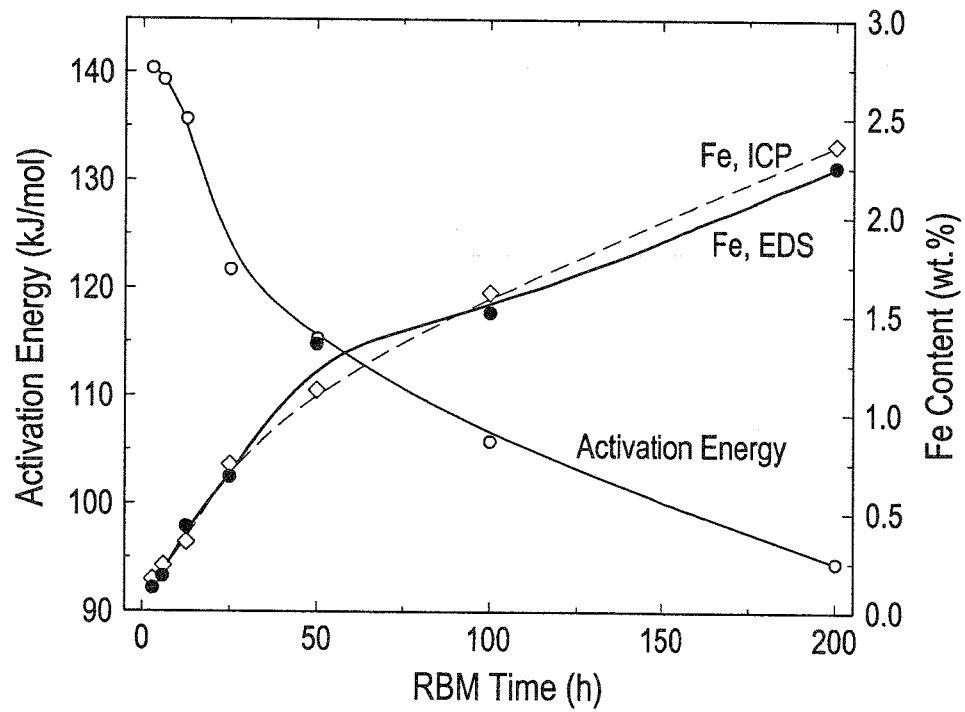

For purposes of the present study, different milling runs using FeCr-balls milling media were achieved under the same experimental conditions to realize the effect of milling tool's materials on $E_a$. The concentrations of FeCr (presented as Fe) introduced to the powders upon collisions during the early stage (3-12.5 h) and intermediate (25-50 h) stages of milling were about 0.4 wt. % and 1.15 wt. %, respectively as shown in FIG. 5(B). It can be observed that improving $E_a$ seen during these stages of milling were mainly attributed to the graining refining process.

Refining of $MgH_2$ powders led to a slight decrease in $E_a$, from about 140 kJ/mol (3 h) to about 116 kJ/mol (50 h), as shown in FIG. 5(B). Further improvement in Ea was attained upon increasing the RBM time to 100 h (~105 kJ/mol) and 200 h (~95 kJ/mol), as elucidated in FIG. 5(B). This obvious decreasing in $E_a$ can be attributed to increasing of the FeCr concentrations that tended to reach relatively high values of about 1.65 wt. % and 2.26 wt. % after 100 h and 200 h of RBM time, respectively.

Thus, it can be concluded that when $MgH_2$ powders were ball milled with the rather "soft" metallic Ni balls, a high abrasion took place during the RBM process, which led to introducing a high concentration of Ni metal particles that played an important catalytic role for enhancing the decomposition of $MgH_2$ at normal pressure.

Example 3

Enthalpy of Hydrogenation and Dehydrogenation

Figure 6A:
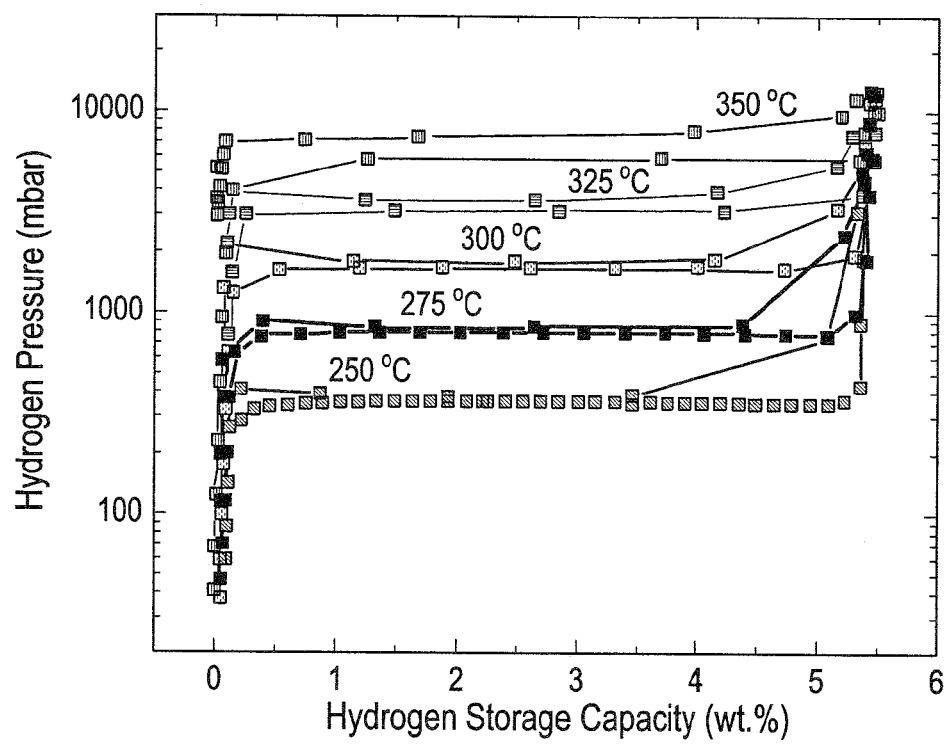
FIG. 6A shows the pressure composition temperature PCT curves of $MgH_2$ powders obtained after 25 h of RBM time using Ni-balls milling media with different applied temperatures (250° C.-350° C.)
Figure 6B:
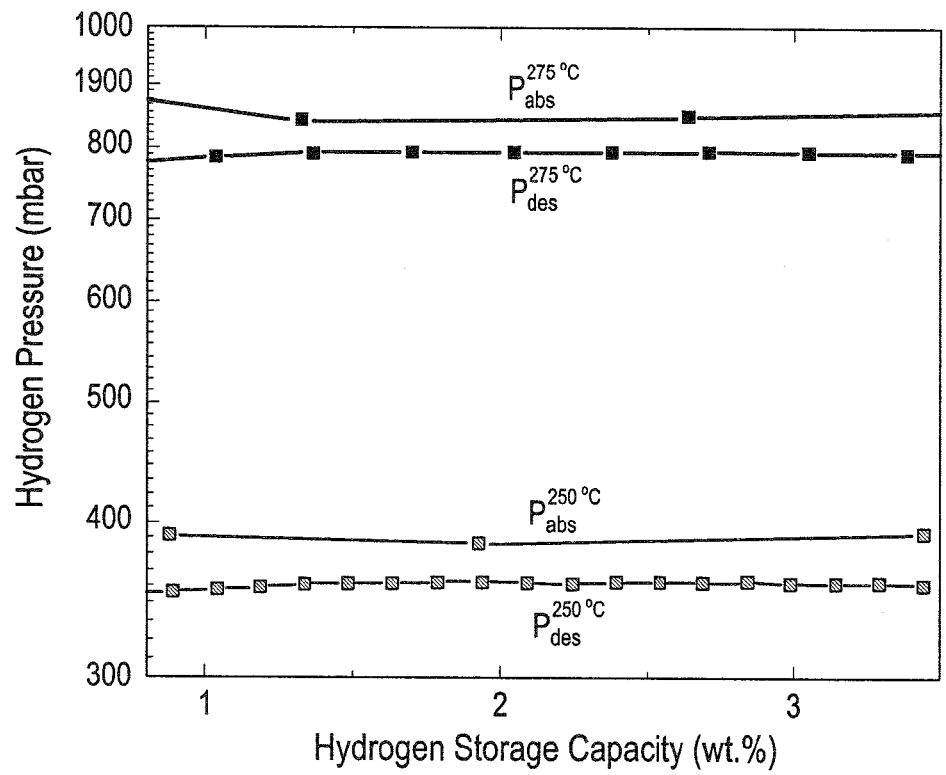
FIG. 6B shows the PCT curves of the flat plateau extended from 0.8 to 3.5 wt. % H2 for the curves resulted with temperatures of 250° C. and 275° C. are displayed together in (B) with a different scale.

The pressure-composition temperature (PCT) relations of $MgH_2$ powder obtained after 25 h of RBM time, using Ni-balls milling media were volumetrically investigated by Sievert's approach at different temperatures of 250, 275, 300, 325, and 350° C., as shown in FIG. 6(A). The powders, which had a maximum hydrogen storage capacity of about 5.5 wt. % FIG. 2(A), possessed excellent PCT hydrogenation/dehydrogenation characteristics. This is implied by the near pressure values required for absorption, (Pabs) and desorption (Pdes) at rather low temperatures of 250° C. (400/320 mbar) and 275° C. (870/780 mbar), as displayed in FIG. 6(B). Moreover, the powders manifested outstanding single-step hydrogenation/dehydrogenation behavior with negligible slope, as displayed in FIG. 6A. Moreover, a single reversible hydrogenation/dehydrogenation cycle was developed for each applied temperature. The presence of clear dehydrogenation plateaus can be seen in all temperature ranges.

However, hydrogenation plateaus can only be seen in the range between 0.25-3.5, 0.25-4.3 and 0.25-4 wt. % $H_2$ at 250° C. 275° C. and 300° C., respectively as displayed in FIG. 6($a$). Flat hydrogenation plateaus in the range of 0.15-4.35 and 0.05-5.4 wt. % $H_2$ were realized at temperatures 325° C. and 350° C.

Figure 7A:
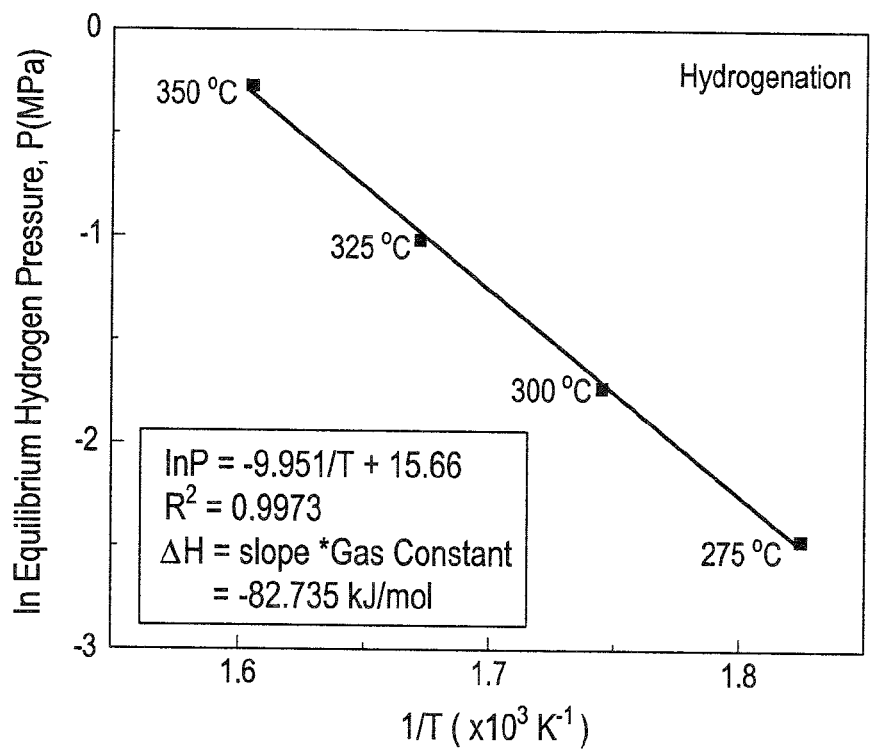
FIG. 7 A-B shows the Van't Hoff plot of the plateaus presented in FIG. 6A, for hydrogenation and dehydrogenation as shown in FIG. A and FIG. B respectively.
Figure 7B:
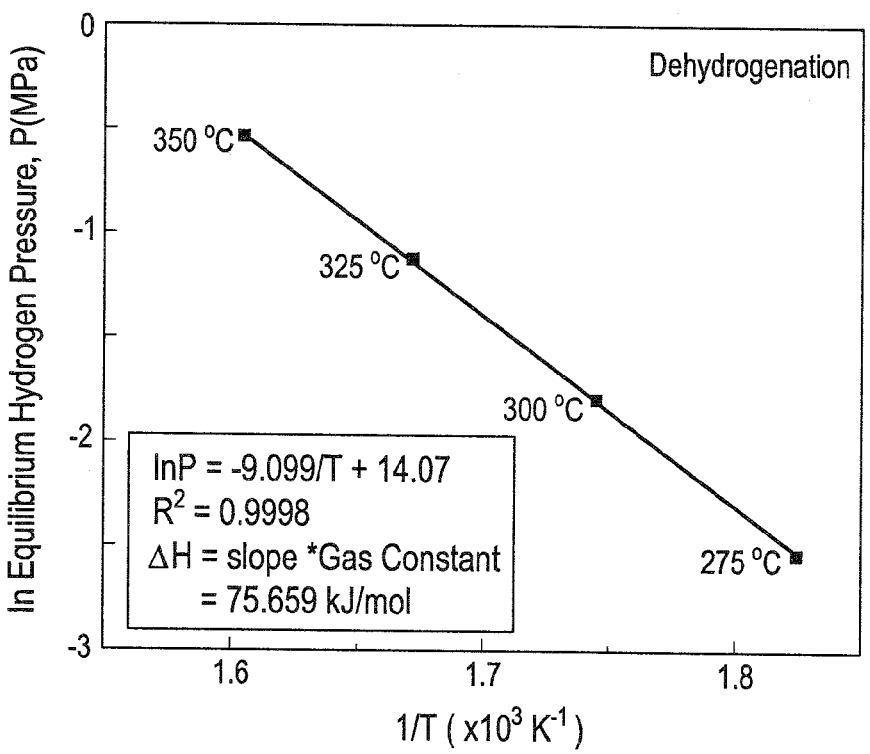

The hydrogen equilibrium pressure measurements were used in the present study to investigate the heat of hydrogen absorption, using Van't Hoff equation:

$$\ln\left(\frac{Peq}{Po}\right) = -\frac{\Delta H}{RT} + \frac{\Delta S}{R} \qquad (2)$$

where $P_{eq}$ is the hydrogen pressure under equilibrium at a given specific temperature, T, $P_0$ is a reference pressure of 1 bar, R is the gas constant (0.0083145 J/K·mol), $\Delta H$ is the molar enthalpy of metal hydride formation ($MgH_2$), and $\Delta S$ is the entropy of absorption. Thus, $\Delta H$ can be directly calculated from plotting the natural log of each $P_{eq}$ point versus the corresponding 1/T, as shown in FIG. 7(A). In the present experiment, the calculated $\Delta H$ of hydrogenation for $MgH_2$ obtained after 25 h of RBM time, using Ni-balls milling media was −82.72 kJ/mol.

The strength of Mg—H bonds, which can be expressed by the enthalpy of decomposition, can be also calculated by Van't Hoff approach, using the equilibrium dehydrogenation pressure in the PCT measurements. A Van't Hoff plot illustrating the relationship between ln(P) and 1/T for the decomposition of $MgH_2$ powders obtained after 25 h is shown in FIG. 7(A).

The $\Delta H$ was directly calculated from the slope of the curve presented in FIG. 7(A) and found to be 75.66 kJ/mol. Comparing this value with those ones of pure $MgH_2$ reported by Reilly and Wiswakk (77.4 kJ/mol), and Klose and Stuke (81.86 kJ/mol), it can be concluded that short-term of ball milling (25 h) $MgH_2$ powders, using Ni-balls milling media, destabilized the chemically stable phase of $MgH_2$, suggested by the rather decrease in the $\Delta H$ of decomposition.

Example 4

The Hydrogenation/Dehydrogenation Behaviors of $MgH_2$ Powder

The hydrogenation kinetics behavior of $MgH_2$ powders obtained after selected RBM time, using Ni-balls milling media were investigated at different temperatures in the range between 50° C. to 275° C., as displayed in FIGS. 8(A) to 8(D). At very low temperature (50° C.), both 25 h and 50 h samples showed good hydrogenation capability for absorbing 3.9 wt. % and 3.6 wt. % $H_2$, respectively within 300 min, as displayed in FIG. 8(A). The degradation on hydrogen storage capacity for 50 h sample is attributed to its higher Ni concentration (6.8 wt. %) when compared with the 25 h sample, which had 5.3 wt. % Ni FIG. 8(D).

Figure 9A:
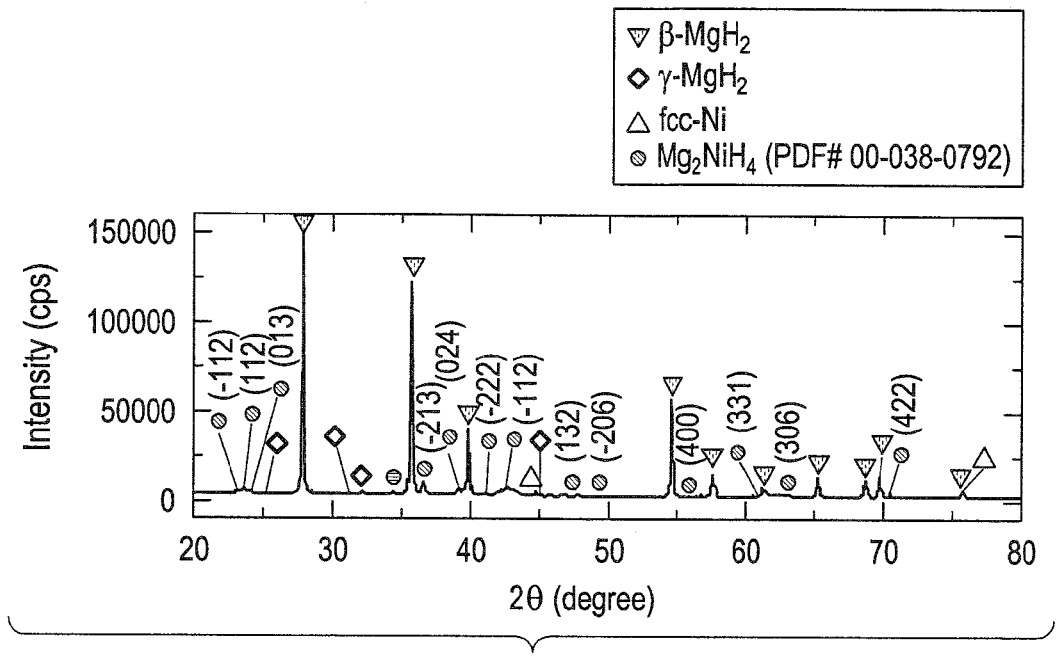
FIGS. 9A-D shows the XRD pattern of $MgH_2$ powders obtained after 25 h and then subjected to hydrogenation process at (A) 50° C., (B) 100° C., (C) 250° C., and (D) 275° C. respectively.
Figure 9B:
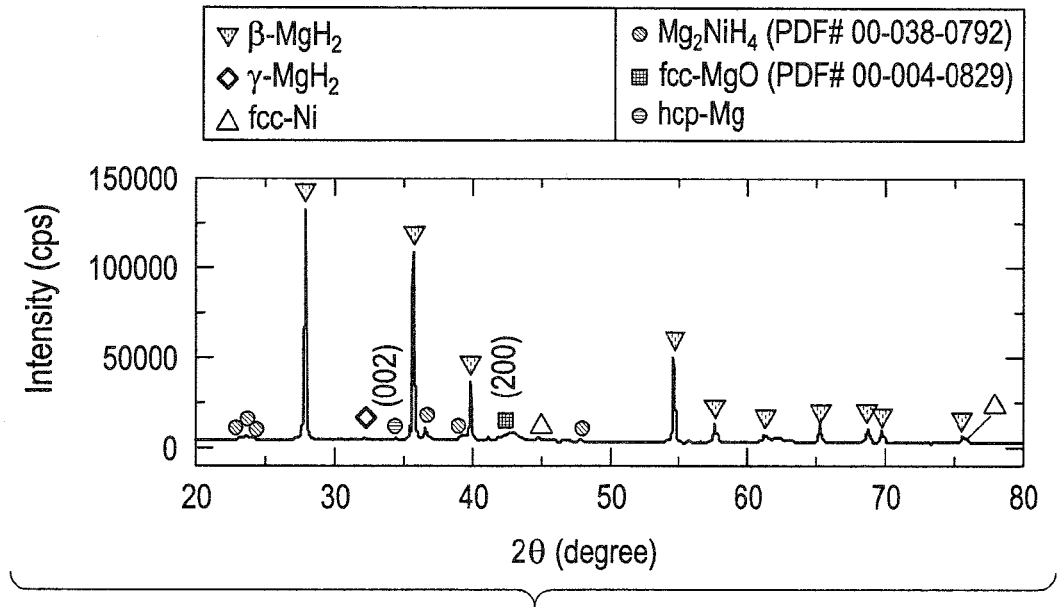

The XRD pattern of 25 h sample taken after hydrogenation process at 50° C. is shown in FIG. 9(A). The sample revealed a domain structure of β-$MgH_2$ coexisted with small molecular fractions of γ-$MgH_2$ and fcc-Ni. In contrast to the powders obtained upon RBM at ambient temperature, a minor molar fraction of Ni metal preferred to react with $MgH_2$ powders during the hydrogenation process to form $Mg_2NiH_4$ phase, as shown in FIG. 9(A).

Figure 8B:
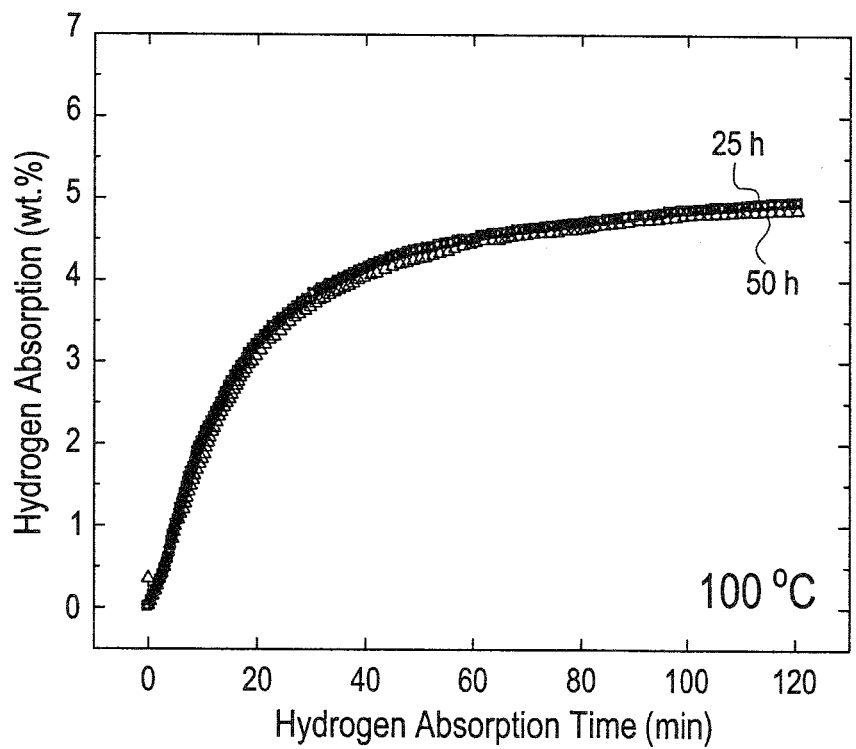

Increasing the hydrogenation temperature to 100° C. led to a remarkable increase in the hydrogen storage capacity for 25 h and 50 h samples to be 5 wt. % and 4.8 wt. %, respectively as displayed in FIG. 8(B). Such a moderate temperature increase led to a significant improvement in the hydrogenation kinetics, suggested by the short time required (120 min) for both samples to get their maximum storage capacity (~5 wt. % $H_2$), as shown in FIG. 8(B).

Figure 10A:
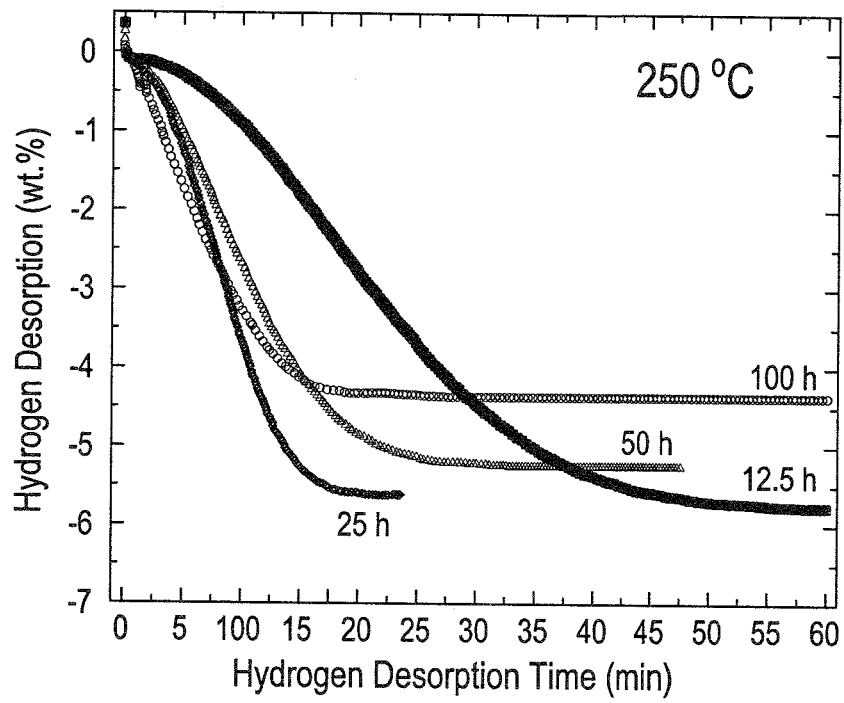
FIGS. 10A-B show the kinetics of dehydrogenation/desorption for $MgH_2$ powders milled with Ni-balls milling media for different RBM time (12.5, 25 h, 50, and 100 h)
Figure 10B:
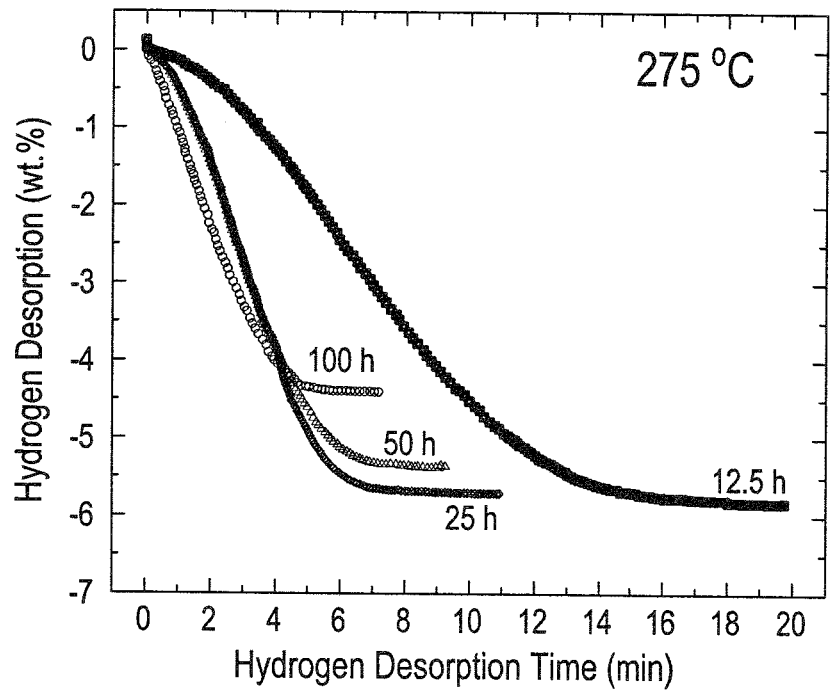

The X-ray analysis of the 25 h sample taken after the hydrogenation experiment at 100° C. indicated the formation of β-$MgH_2$ coexisted with metastable β-$MgH_2$ phases, as shown in FIG. 10(B). In addition to these phases, fcc-Ni and the reacted $Mg_2NiH_4$ phases were detected as well, as shown in the FIG. 10(B).

Figure 8C:
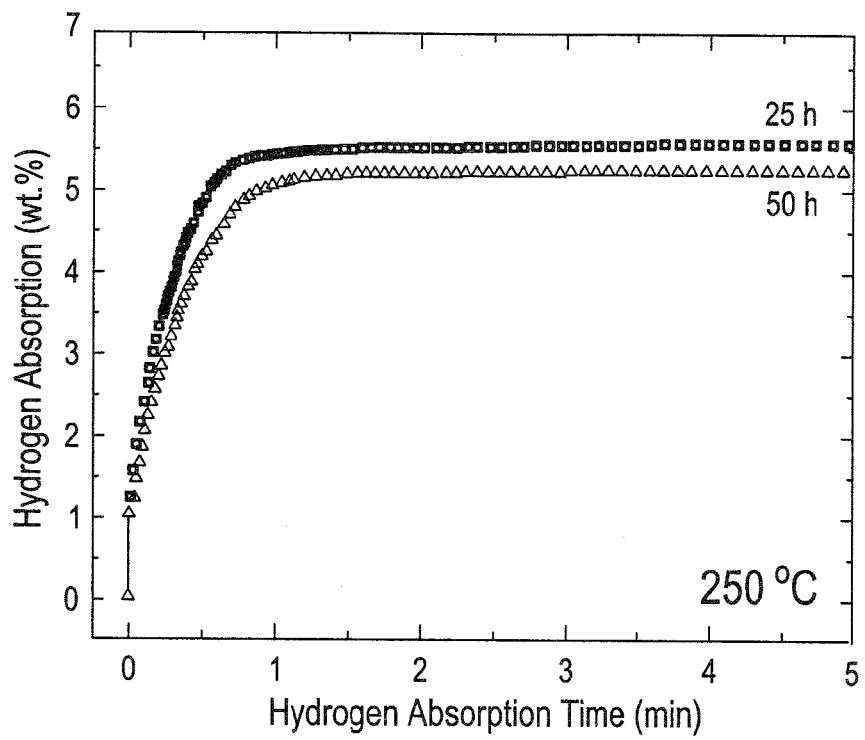
Figure 8D:
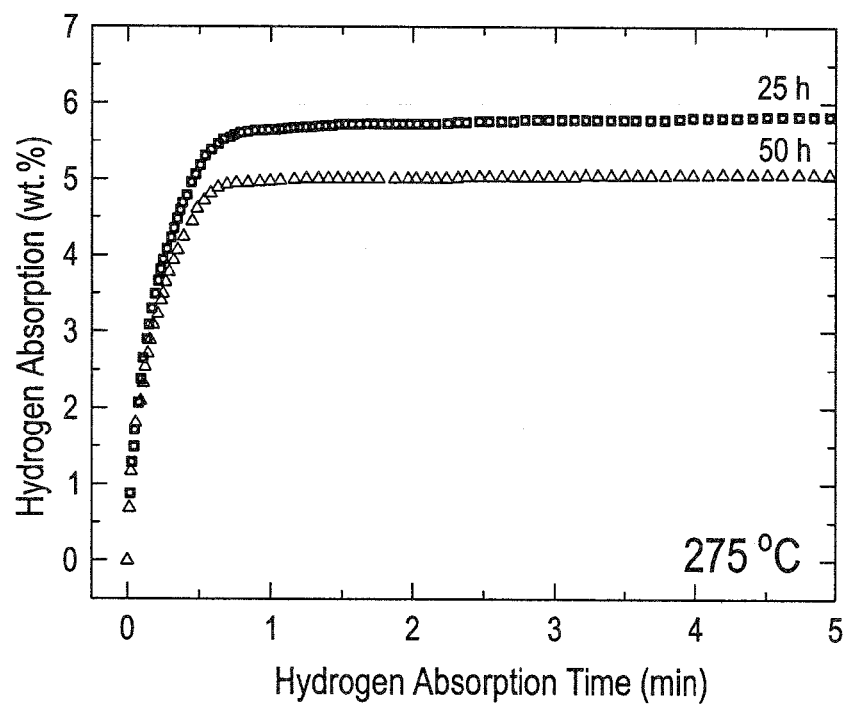

FIG. 8(C) displays the hydrogenation kinetics behavior of 25 h and 50 h samples examined at 250° C. After 0.5 min, 25 h sample absorbed about 5 wt. % $H_2$, whereas the 50 h sample absorbed only 4.3 wt. % $H_2$ as shown in FIG. 8(C). After 1.4 min, the 25 h and 50 h samples saturated at a hydrogen storage capacity of 5.5 wt. %, and 5.2 wt. % respectively, as elucidated in FIG. 8(C). These values did not show any changes upon increasing the absorption time up to 5 min.

Figure 8E:
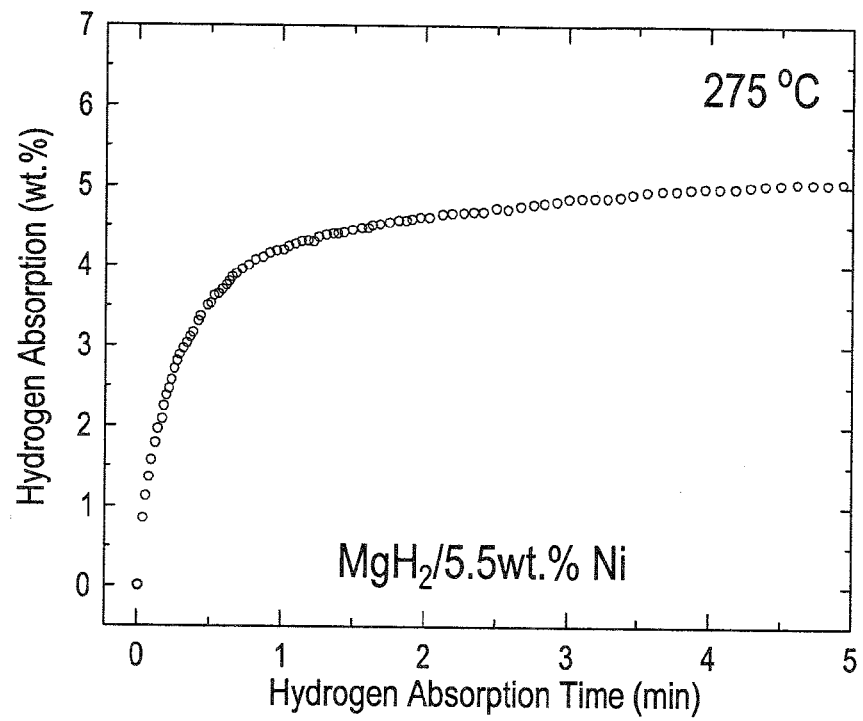
FIG. 8E shows the hydrogenation kinetics of a different sample obtained after 25 h of RBM a mixture of $MgH_2$ doped with 5.5 wt. % Ni nanoparticles for comparison.

More improvement on the hydrogen absorption kinetics and storage capacity were attained for the 25 h sample when the hydrogenation temperature increased to 275° C. The sample reached its maximum hydrogen storage capacity (5.8 wt. %) after 2.5 min, as shown in FIG. 10(D). Same improvement can be realized for the 50 h sample, however, its high Ni content lowered its hydrogen storage capacity to about 5 wt. %, as elucidated in FIG. 8(D). Comparing these results with those obtained upon ball milling the $MgH_2$ powders with 5.5 wt. % Ni nanoparticles for 25 h as shown in FIG. 8(E), it can be concluded that our new approach of introducing Ni particles gradually into the $MgH_2$ matrix is considered to be the most prominent factor for the formation of homogeneous $MgH_2$/Ni nanocomposite powders. Accordingly, this new catalyzation technique leads to superior hydrogenation kinetics even at low temperatures.

Figure 9C:
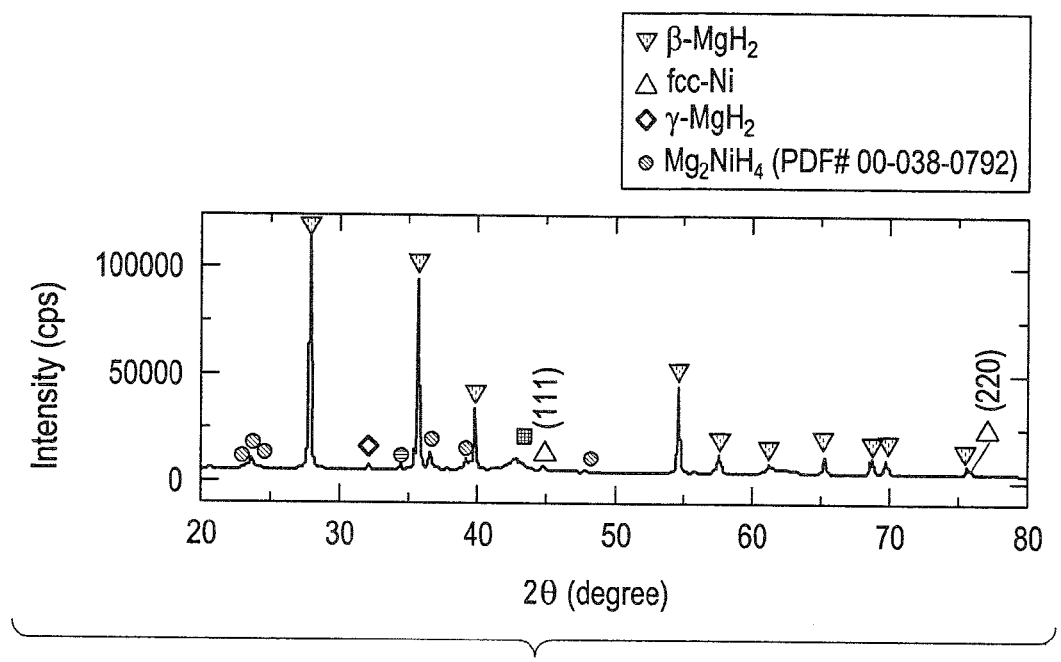
Figure 9D:
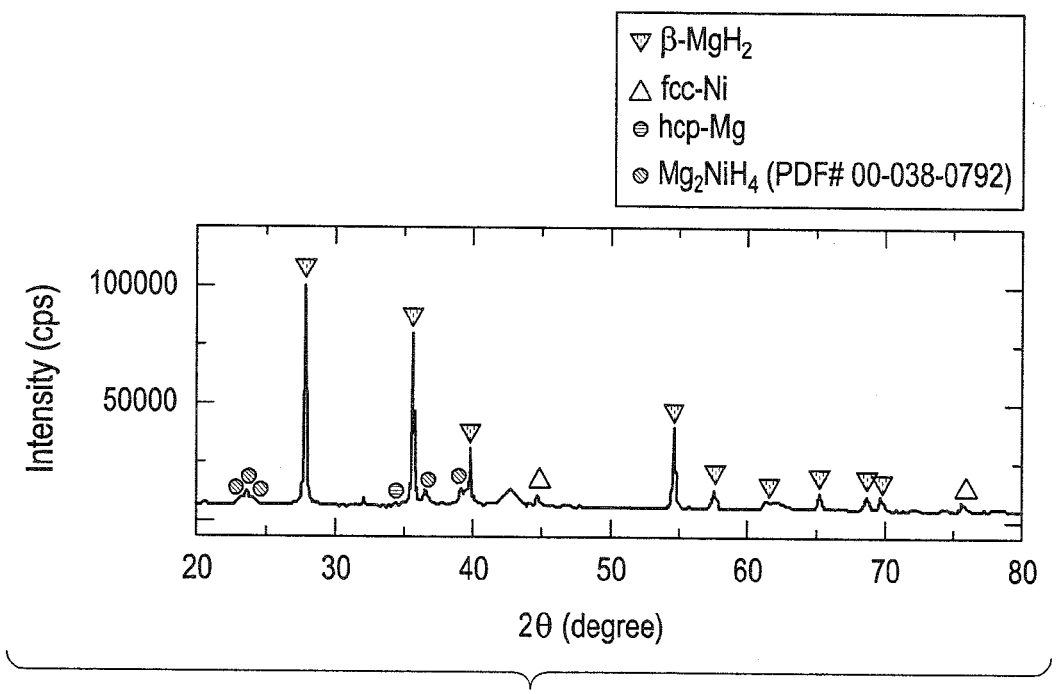

The XRD patterns of the sample milled for 25 h and then taken after hydrogenation process at 250° C. and 275° C., are shown in FIGS. 9(C) and 9(D), respectively. At such relatively high temperatures, the reacted $Mg_2NiH_4$ phase was grown, as suggested by the rather high intensity of their major Bragg peaks laid between scattering angle of 22° and 23° FIGS. 9(C) and 9(D).

It should be emphasized that the existence of this phase together with fcc-Ni may play a superior role for successful and fast dehydrogenation process, as will be discussed in the next section. In contrast to this sample, the hydrogenation kinetics of $MgH_2$ powders obtained after for 25 h of RBM time, using FeCr-balls milling media revealed slower kinetics, suggested by the longer time required (5 min) to absorb 5 wt. % $H_2$, as displayed in FIG. 8(E).

Figure 8F:
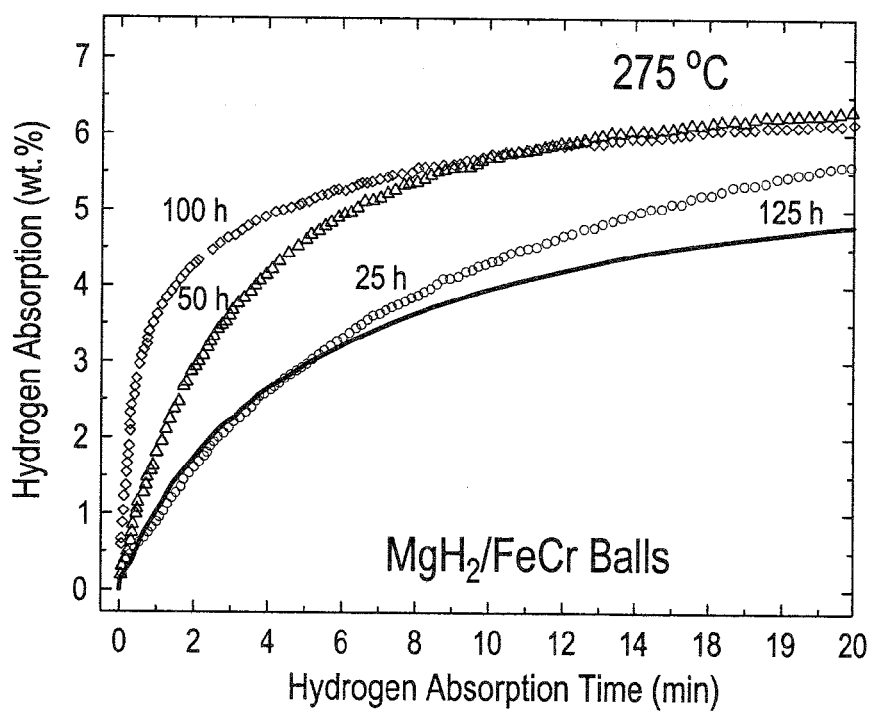
FIG. 8F shows the kinetics of hydrogenation for those samples obtained after different RBM time (12.5 h, 25 h, 50 h, and 100 h), using FeCr-balls milling media.

In order to understand the effect of Ni-particles introduced to $MgH_2$ powders upon milling with Ni-balls milling media on improving the hydrogenation properties of $MgH_2$, we have employed FeCr-balls milling media for preparing $MgH_2$ powders under the same experimental conditions. FIG. 8(F) shows the effect of RBM time on the hydrogenation kinetics of $MgH_2$ powders achieved at 275° C. However, the hydrogenation kinetics was improved with increasing the RBM time and FeCr content, the samples obtained after 25 h to 100 h required longer time (~20 min) to reach to ~6 wt. %, as shown in FIG. 8(F).

Example 5

The Kinetics of Dehydrogenation

The dehydrogenation kinetics examined at 250° C. and 275° C. of the samples obtained after different stages of the RBM time (12.5, 25, 50, and 100 h) using Ni-balls milling media are shown in FIGS. 10(A) and 10(B), respectively. The 12.5 h sample showed a poor kinetics at 250° C., indicated by the very long time required (60 min) to reach its saturated hydrogen storage capacity (5.8 wt. %), as shown in FIG. 10(A). Significant improvement on its hydrogenation kinetics can be realized with increasing the hydrogenation temperature to 275° C. (FIG. 10(B)) when the 12.5 h sample released its maximum hydrogen storage capacity (5.8 wt. %) within 20 min only.

Figure 11A:
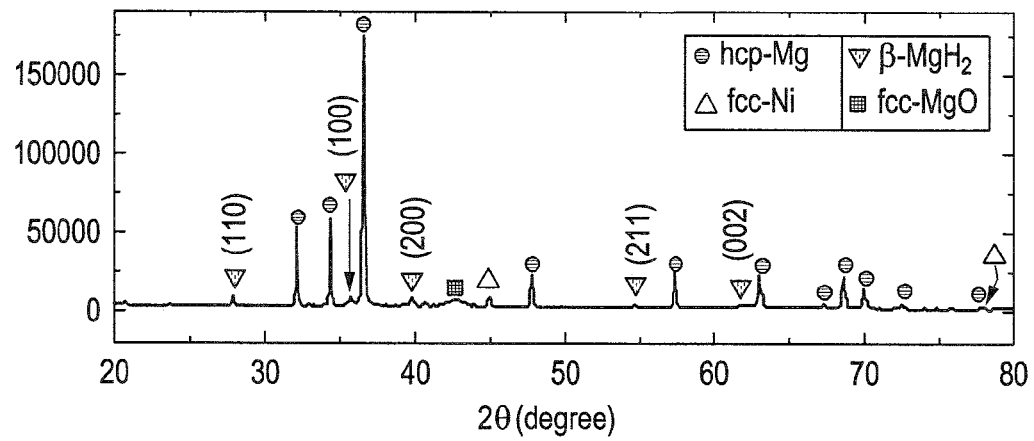
FIGS. 11A-D shows the XRD patterns of the samples obtained after 12.5 h, 25 h, 50 h and 100 h, respectively.

The XRD pattern of this sample taken after the dehydrogenation process achieved at 275° C. (FIG. 11(A) indicated that the powders consisted of hcp-Mg coexisted with Ni metal. Minor molecular fractions of β-MgH2 phase was also detected, as shown in FIG. 11(E).

Significant improvement on its hydrogenation kinetics can be realized with increasing the hydrogenation temperature to 275° C. FIG. 10(B) when the 12.5 h sample released its maximum hydrogen storage capacity (5.8 wt. %) within 20 min only.

The XRD pattern of this sample taken after the dehydrogenation process achieved at 275° C. (FIG. 11(A) indicated that the powders consisted of hcp-Mg coexisted with Ni metal. Minor molecular fractions of β-MgH2 phase was also detected, as shown in FIG. 11(A).

The sample obtained after 25 h of RBM using Ni balls milling media showed a different dehydrogenation behavior when compared with the 12.5 h sample. It had the capability to desorb 5.8 wt. % within 21 min and 9 min at 250° C. and 275° C., as elucidated in FIGS. 10(A) and 10(B), respectively.

Such a fast desorption behavior can be attributed to its higher Ni content (5.5 wt. %) when compared with the 12.5 h sample (3 wt. %). Moreover, the presence of $Mg_2NiH_4$ phase resulted in the 25 h sample (illustrated in FIGS. 9(C) and 9(D)) may also play an effective catalytic role for improving the dehydrogenation process. This phase could not be detected in the XRD pattern of the 12.5 h sample after hydrogenation process.

Figure 11B:
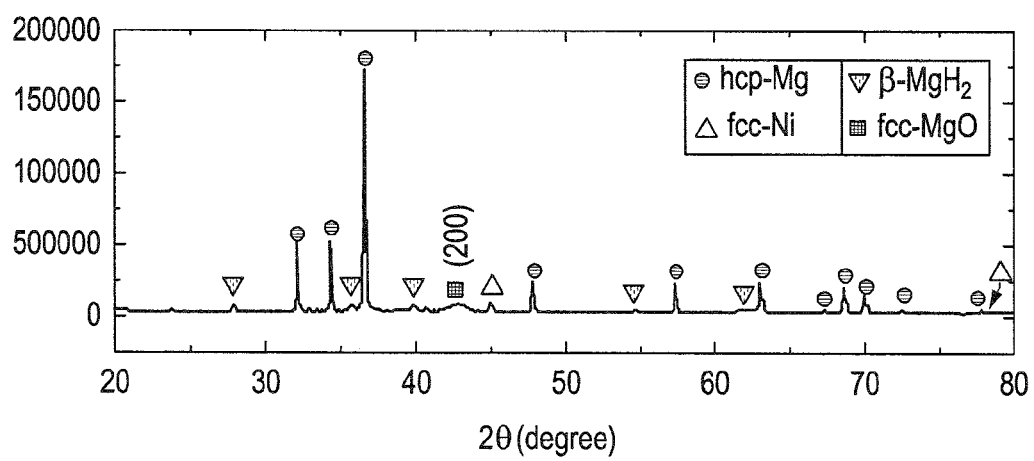

The XRD pattern of 25 h sample after achieving a complete desorption at 275° C. is shown in FIG. 11(B). Beside those Bragg diffractions related to hcp-Mg, fcc-Ni and un-desorbed β-$MgH_2$ is appeared. The absence of the reacted $Mg_2NiH_4$ phase formed during the hydrogenation process can be realized. This suggests a full decomposition of this phase into hcp-$Mg_2Ni$ and $H_2$ during the dehydrogenation process. Moreover, the dehydrogenation kinetics behavior investigated at 250° C. FIG. 10(A) and 275° C. (FIG. 10(B) of the samples obtained after 50 h and 100 h of RBM time using Ni-balls milling media did not show better kinetics when compared with 25 h sample.

One drawback of further milling is the remarkable increase of unnecessary Ni particles introduced to the powders processed for 50 h (6.8 wt. %) and 100 h (7.6 wt. %), as can be seen in FIG. 5(A). Introducing of massive volume fractions of Ni to the $MgH_2$ powders led to decrease the hydrogen storage capacity of 50 h and 100 h samples to about −5.3 wt. % and −4.4 wt. %, respectively as shown in FIGS. 10(A) and 10(B).

Figure 11C:
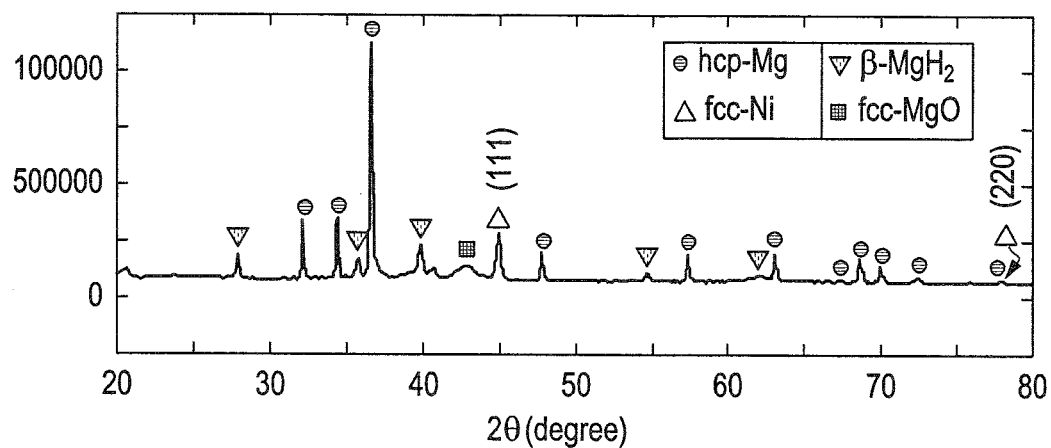
Figure 11D:
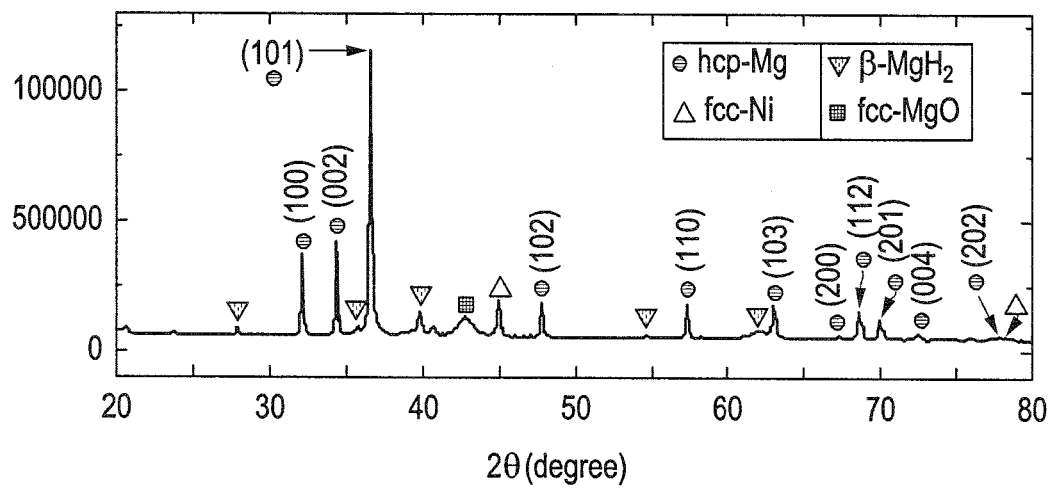

The XRD patterns of 50 h and 100 h sample examined after achieving dehydrogenation experiments at 275° C. are presented in FIGS. 11(C) and 11(D), respectively. Both samples consisted of pronounced Bragg diffractions corresponding to hcp-Mg metals. This domain hcp-structure was coexisted with fcc-Ni metals that introduced to the powders upon using Ni-balls and small molar fractions of $Mg_2Ni$ alloy.

Figure 10C:
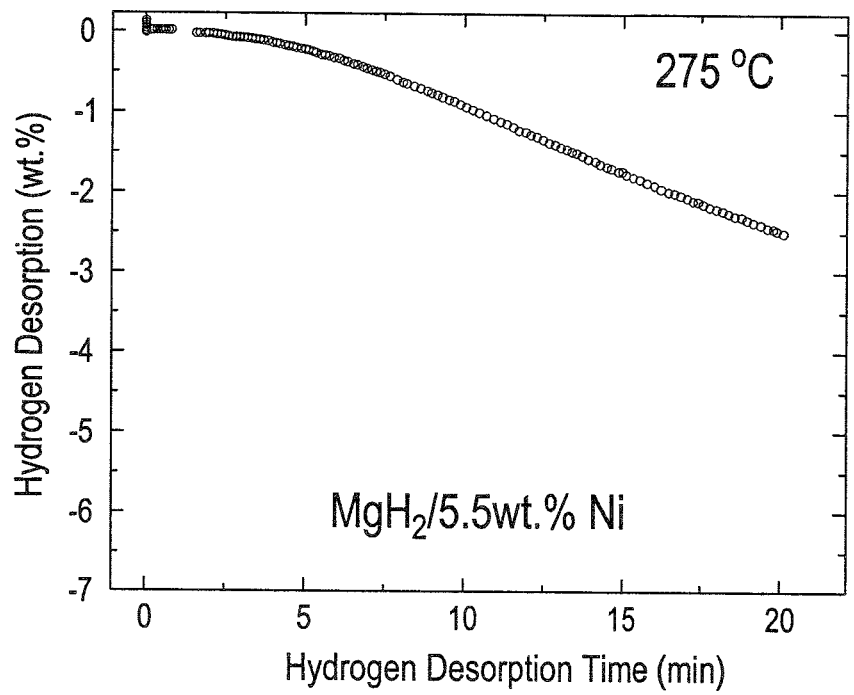
FIG. 10C shows the kinetics of dehydrogenation investigated at 275° C. for MgH$_2$ powders doped with 5.5 wt. % Ni nanoparticles and then RBM for 25 h.
Figure 10D:
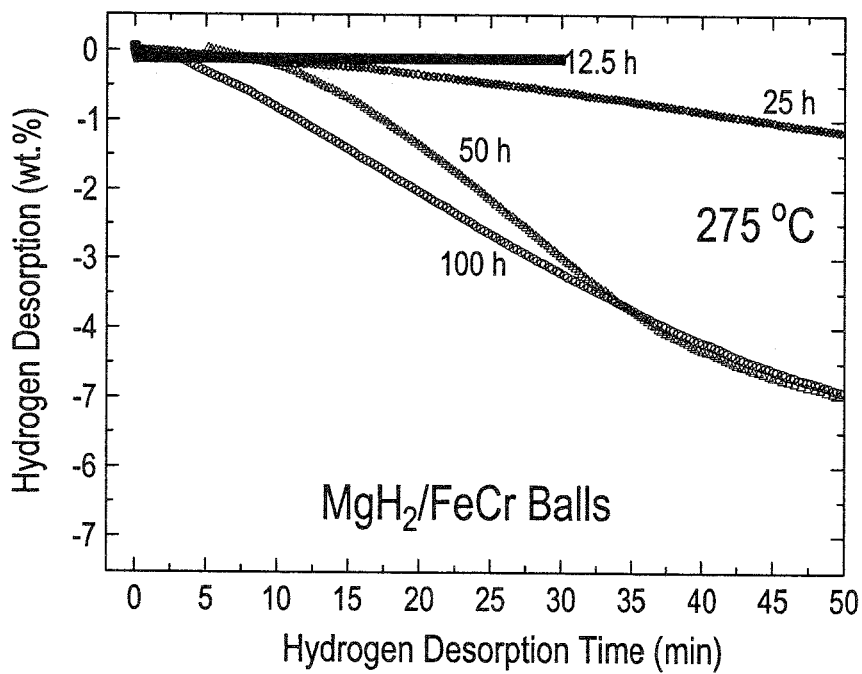
FIG. 10D shows the kinetics of dehydrogenation of MgH$_2$ powders milled with FeCr-balls milling media obtained for different RBM time (12.5 h, 25 h, 50 h, and 100 h).

In contrast, the dehydrogenation process conducted at 275° C. for $MgH_2$ powders milled with 5.5 wt. % of Ni nanoparticles for 25 h revealed poor kinetics, implied by the very long time (20 min) required to desorb about 2.5 wt. % $H_2$, as shown in FIG. 10(C). The kinetics of desorption measure at 275° C. for those samples obtained after different RBM time, using FeCr-balls revealed poor dehydrogenation kinetics FIG. 10(D), indexed by the very long time (50 min) required for releasing −1 wt. % (25 h), and ~−5 wt. % (50 and 100 h) of hydrogen gas, as elucidated in FIG. 10(D).

Example 6

Cycle Life-Time

Cycle-life-time examinations were conducted to characterize the capability of metal hydrides to achieve continuous cyclic hydrogenation/dehydrogenation processes. Successful metal hydride powders should maintain their hydrogen storage capacity without failure. In addition, the powders should show sustainable hydrogenation/dehydrogenation kinetics without serious degradation.

The $MgH_2$ powders obtained after 25 h of RBM, using Ni-balls milling media were subjected to 100 hydrogenation/dehydrogenation cycles conducted for 56 h at 275° C. under a hydrogen gas pressure ranging between 10 bar (hydrogenation) 100 mbar (dehydrogenation). The powders were firstly activated by applying cyclic hydrogen gas sorption/desorption under pressure of 35 bar at 350° C. for 10 continuous cycles. This treatment is necessary for surface cleaning of the powders and to break down the oxide phase (MgO) formed on the powder surfaces.

Figure 12:
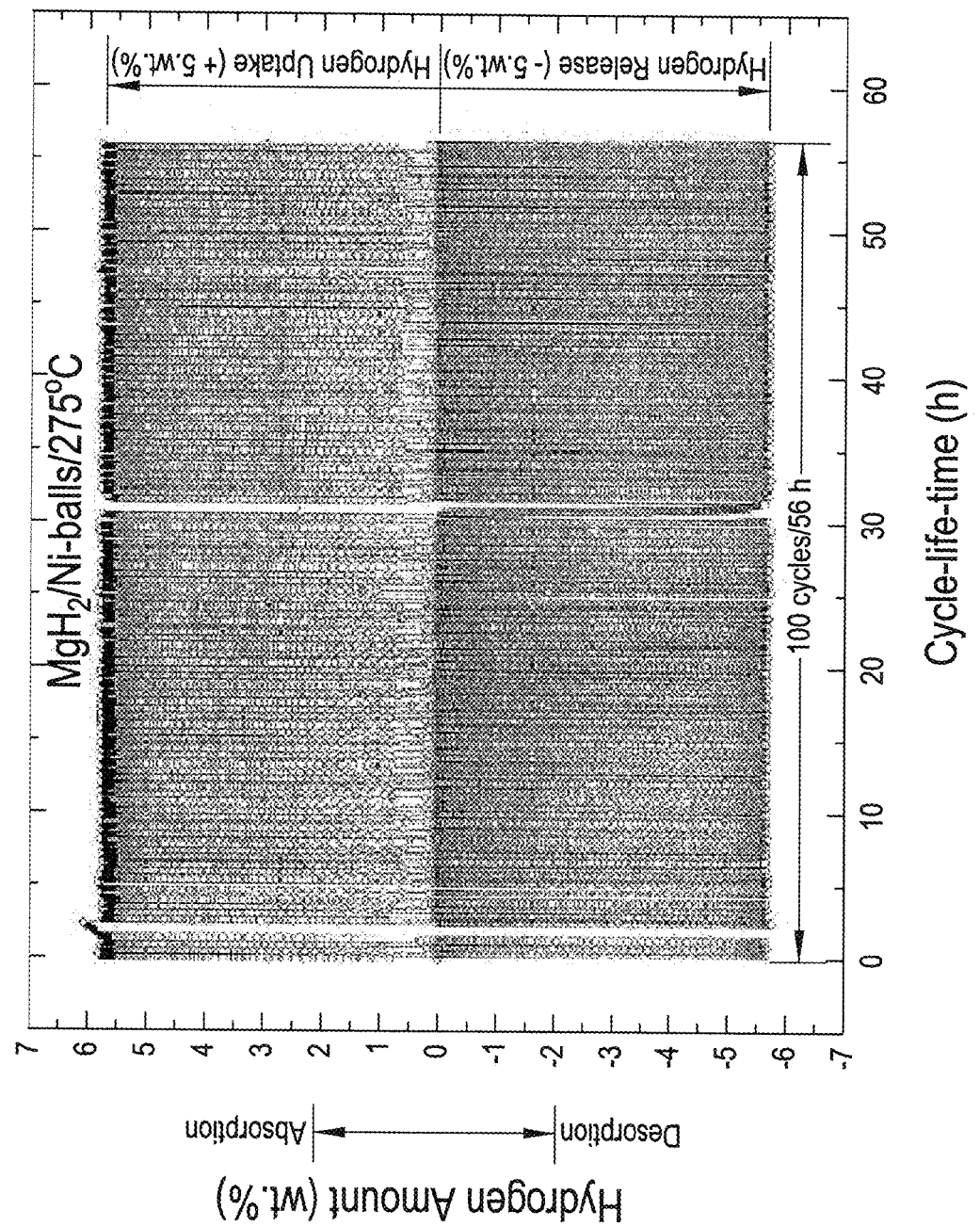
FIG. 12 shows the cycle life time conducted at 275° C. for the sample obtained after 25 h of RBM time, using Ni-balls milling media.

FIG. 12 shows the hydrogen absorbed/desorbed cycles achieved continuously for 100 cycles at a temperature of 275° C. No remarkable degradation in the hydrogen storage capacity could be detected even after 100 cycles (56 h), maintained at the level of 5.8 wt. %, as shown in FIG. 12. Moreover, the kinetics of hydrogenation/dehydrogenation processes remain constant with no failure or decay.

It is to be understood that the present invention is not limited to the embodiments described above, but encompasses any and all embodiments within the scope of the following claims.

We claim:

1. A method for synthesis of $MgH_2$/Ni nanocomposites, consisting of:
   balancing 5 g of magnesium (Mg) powder in a ball milling container with helium (He) gas atmosphere;
   adding a plurality of nickel (Ni) milling balls to the container, wherein an average diameter of the milling balls is about 11 mm;
   introducing hydrogen ($H_2$) gas to the container to form a $MgH_2$ powder, wherein the pressure of the container is about 50 bar; and
   milling the $MgH_2$ powder using the Ni milling balls as milling media to provide the $MgH_2$/Ni nanocomposites, wherein the milling is a reactive ball milling.

2. The method for synthesis of $MgH_2$/Ni nanocomposites according to claim 1, wherein the milling occurs at room temperature.

3. The method for synthesis of $MgH_2$/Ni nanocomposites according to claim 1, wherein the plurality of milling balls includes at least 25 milling balls.

4. The method for synthesis of $MgH_2$/Ni nanocomposites according to claim 1, wherein a weight ratio of the milling balls to the powder is about 38:1.

5. The method for synthesis of $MgH_2$/Ni nanocomposites according to claim 1, wherein the ball milling occurs for a period of time ranging from about 25 hours to about 50 hours.

6. The method for synthesis of $MgH_2$/Ni nanocomposites according to claim 1, wherein the $MgH_2$/Ni nanocomposites include a homogenous distribution of Ni particles embedded in a $MgH_2$ matrix.

7. The method for synthesis of $MgH_2$/Ni nanocomposites according to claim 1, wherein the Mg powder has an average particle size of about 100 micrometers.

8. The method for synthesis of $MgH_2$/Ni nanocomposites according to claim 1, wherein an average composition of the nanocomposite includes about 94.5 wt. % MgH2 and about 5.5 wt. % Ni.

9. The method for synthesis of $MgH_2$/Ni nanocomposites according to claim 1, wherein a particle size of the nanocomposite ranges from about 1 nm to about 100 nm.

* * * * *